United States Patent
Kedem et al.

(10) Patent No.: US 12,101,354 B2
(45) Date of Patent: *Sep. 24, 2024

(54) DEVICE, SYSTEM, AND METHOD OF DETECTING VISHING ATTACKS

(71) Applicant: BioCatch Ltd., Tel Aviv (IL)

(72) Inventors: Oren Kedem, Tel Aviv (IL); Avi Turgeman, New York, NY (US); Itai Novick, Rehovot (IL); Alexander Basil Zaloum, Brooklyn, NY (US); Leonid Karabchevsky, Shimshit (IL); Shira Mintz, Ramat HaSharon (IL); Ron Uriel Maor, London (GB)

(73) Assignee: BIOCATCH LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,966

(22) Filed: Oct. 30, 2023

(65) Prior Publication Data
US 2024/0080339 A1 Mar. 7, 2024

Related U.S. Application Data

(63) Continuation of application No. 17/359,579, filed on Jun. 27, 2021, now Pat. No. 11,838,118, which is a
(Continued)

(51) Int. Cl.
*H04L 9/40* (2022.01)
*G01C 9/00* (2006.01)
(Continued)

(52) U.S. Cl.
CPC ............ *H04L 63/1483* (2013.01); *G01C 9/00* (2013.01); *G06F 16/00* (2019.01); *G06F 21/316* (2013.01);
(Continued)

(58) Field of Classification Search
CPC ......... G01C 9/00; G06F 16/00; G06F 21/316; G06F 21/552; G06F 21/554;
(Continued)

(56) References Cited

U.S. PATENT DOCUMENTS 3,618,019 A * 11/1971 Nemirovsky ............ G07C 9/35
382/121
3,699,517 A * 10/1972 Dyche ...................... G07C 9/35
382/122
(Continued)

*Primary Examiner* — Gary S Gracia
(74) *Attorney, Agent, or Firm* — AlphaPatent Associates Ltd.; Daniel J. Swirsky

(57) ABSTRACT

Devices, systems, and methods of detecting a vishing attack, in which an attacker provides to a victim step-by-step over-the-phone instructions that command the victim to log-in to his bank account and to perform a dictated banking transaction. The system monitors transactions, online operations, user interactions, gestures performed via input units, speed and timing of data entry, and user engagement with User Interface elements. The system detects that the operations performed by the victim, follow a pre-defined playbook of a vishing attack. The system detects that the victim operates under duress or under dictated instructions, as exhibited in irregular doodling activity, data entry rhythm, typographical error introduction rhythm, unique posture of the user, alternating pattern of listening to phone instructions and performing online operations via a computer, and device orientation changes or spatial changes that characterize a device being used to perform an online transaction while also talking on the phone.

19 Claims, 1 Drawing Sheet

Related U.S. Application Data continuation of application No. 16/188,312, filed on Nov. 13, 2018, now abandoned, which is a continuation-in-part of application No. 15/819,400, filed on Nov. 21, 2017, now Pat. No. 10,970,394, said application No. 17/359,579 is a continuation-in-part of application No. 16/872,381, filed on May 12, 2020, now Pat. No. 11,210,674, which is a continuation of application No. 16/242,015, filed on Jan. 8, 2019, now Pat. No. 10,685,355, which is a continuation-in-part of application No. 16/057,825, filed on Aug. 8, 2018, now Pat. No. 10,523,680, which is a continuation of application No. 15/203,817, filed on Jul. 7, 2016, now Pat. No. 10,069,837, said application No. 16/242,015 is a continuation-in-part of application No. 15/885,819, filed on Feb. 1, 2018, now Pat. No. 10,834,590, which is a continuation-in-part of application No. 14/675,764, filed on Apr. 1, 2015, now abandoned, which is a continuation-in-part of application No. 14/566,723, filed on Dec. 11, 2014, now Pat. No. 9,071,969, which is a continuation-in-part of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, said application No. 14/675,764 is a continuation-in-part of application No. 14/320,653, filed on Jul. 1, 2014, now Pat. No. 9,275,337, said application No. 14/675,764 is a continuation-in-part of application No. 14/320,656, filed on Jul. 1, 2014, now Pat. No. 9,665,703, said application No. 14/675,764 is a continuation-in-part of application No. 14/325,393, filed on Jul. 8, 2014, now Pat. No. 9,531,733, said application No. 14/675,764 is a continuation-in-part of application No. 14/325,394, filed on Jul. 8, 2014, now Pat. No. 9,547,766, said application No. 14/675,764 is a continuation-in-part of application No. 14/325,395, filed on Jul. 8, 2014, now Pat. No. 9,621,567, said application No. 14/675,764 is a continuation-in-part of application No. 14/325,396, filed on Jul. 8, 2014, now abandoned, said application No. 14/675,764 is a continuation-in-part of application No. 14/325,397, filed on Jul. 8, 2014, now Pat. No. 9,450,971, said application No. 14/675,764 is a continuation-in-part of application No. 14/325,398, filed on Jul. 8, 2014, now Pat. No. 9,477,826, said application No. 16/242,015 is a continuation-in-part of application No. 15/368,608, filed on Dec. 4, 2016, now Pat. No. 10,949,757, which is a continuation-in-part of application No. 15/001,259, filed on Jan. 20, 2016, now Pat. No. 9,541,995, which is a continuation of application No. 14/320,653, filed on Jul. 1, 2014, now Pat. No. 9,275,337, which is a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942, said application No. 15/368,608 is a continuation-in-part of application No. 14/727,873, filed on Jun. 2, 2015, now Pat. No. 9,526,006, and a continuation-in-part of application No. 15/360,291, filed on Nov. 23, 2016, now Pat. No. 9,747,436, which is a continuation-in-part of application No. 14/718,096, filed on May 21, 2015, now Pat. No. 9,531,701, which is a continuation-in-part of application No. 14/675,768, filed on Apr. 1, 2015, now Pat. No. 9,418,221, which is a continuation-in-part of application No. 14/566,723, filed on Dec. 11, 2014, now Pat. No. 9,071,969.

(60) Provisional application No. 62/621,600, filed on Jan. 25, 2018, provisional application No. 62/190,264, filed on Jul. 9, 2015, provisional application No. 61/973,855, filed on Apr. 2, 2014, provisional application No. 61/843,915, filed on Jul. 9, 2013, provisional application No. 61/417,479, filed on Nov. 29, 2010.

(51) Int. Cl.
| | |
|---|---|
| *G06F 16/00* | (2019.01) |
| *G06F 21/31* | (2013.01) |
| *G06F 21/55* | (2013.01) |
| *G06Q 20/40* | (2012.01) |
| *H04W 12/12* | (2021.01) |
| *H04W 12/128* | (2021.01) |
| *H04W 12/68* | (2021.01) |
| *G06F 3/02* | (2006.01) |
| *G06F 3/0354* | (2013.01) |
| *G06F 3/04883* | (2022.01) |
| *H04L 67/02* | (2022.01) |

(52) U.S. Cl.
CPC ....... *G06F 21/554* (2013.01); *G06Q 20/4016* (2013.01); *H04L 63/1425* (2013.01); *H04W 12/12* (2013.01); *H04W 12/128* (2021.01); *H04W 12/68* (2021.01); *G06F 3/0227* (2013.01); *G06F 3/03543* (2013.01); *G06F 3/04883* (2013.01); *H04L 67/02* (2013.01)

(58) Field of Classification Search
CPC .... G06F 3/0227; G06F 3/023; G06F 3/03543; G06F 3/038; G06F 3/04883; G06Q 20/108; G06Q 20/16; G06Q 20/4016; G06Q 40/02; H04L 63/1425; H04L 63/1483; H04L 67/02; H04W 12/12; H04W 12/128; H04W 12/68
See application file for complete search history.

(56) References Cited

U.S. PATENT DOCUMENTS

| | | | | |
|---|---|---|---|---|
| 3,983,535 | A * | 9/1976 | Herbst | G06Q 20/40 382/218 |
| 4,128,829 | A * | 12/1978 | Herbst | G06V 10/754 382/218 |
| 4,621,334 | A * | 11/1986 | Garcia | G07C 9/35 400/663 |
| 4,760,386 | A * | 7/1988 | Heath | G06F 3/04892 345/161 |
| 4,805,222 | A * | 2/1989 | Young | G06V 40/28 382/209 |
| 5,305,238 | A * | 4/1994 | Starr, III | G06F 11/3409 702/176 |
| 5,442,342 | A * | 8/1995 | Kung | G07F 7/1016 235/382 |
| 5,485,171 | A * | 1/1996 | Copper | G06F 3/0338 345/184 |
| 5,557,686 | A * | 9/1996 | Brown | G07C 9/33 382/209 |
| 5,565,657 | A * | 10/1996 | Merz | G06F 3/04144 178/18.01 |
| 5,581,261 | A * | 12/1996 | Hickman | H04L 61/5084 340/8.1 |
| 5,838,306 | A * | 11/1998 | O'Connor | G06F 21/32 345/163 |

(56) References Cited

U.S. PATENT DOCUMENTS

| | | | | |
|---|---|---|---|---|
| 5,874,941 A * | 2/1999 | Yamada | G06F 3/0346 | 345/157 |
| 5,999,162 A * | 12/1999 | Takahashi | G09G 1/162 | 345/440.1 |
| 6,028,271 A * | 2/2000 | Gillespie | G06F 3/03547 | 178/18.06 |
| 6,202,023 B1 | 3/2001 | Hancock | H04L 67/30 | 707/E17.11 |
| 6,209,102 B1 * | 3/2001 | Hoover | G06F 21/34 | 380/268 |
| 6,337,686 B2 * | 1/2002 | Wong | G09G 5/28 | 345/443 |
| 6,337,919 B1 * | 1/2002 | Dunton | G06V 40/13 | 345/163 |
| 6,442,692 B1 * | 8/2002 | Zilberman | G06F 21/316 | 713/184 |
| 6,572,014 B1 * | 6/2003 | Lambert | G06F 3/03543 | 235/382 |
| 6,743,022 B1 * | 6/2004 | Sarel | A61B 5/16 | 340/5.82 |
| 6,819,219 B1 * | 11/2004 | Bolle | G06Q 20/40145 | 340/5.82 |
| 6,836,554 B1 * | 12/2004 | Bolle | G07C 9/37 | 902/4 |
| 6,895,514 B1 * | 5/2005 | Kermani | G06F 21/316 | 726/19 |
| 6,931,131 B1 * | 8/2005 | Becker, Jr. | G06F 21/36 | 463/31 |
| 6,938,061 B1 * | 8/2005 | Rumynin | G06F 7/5318 | 708/626 |
| 6,938,159 B1 * | 8/2005 | O'Connor | G06F 21/32 | 713/186 |
| 6,957,185 B1 * | 10/2005 | Labaton | G06Q 20/401 | 380/279 |
| 6,957,186 B1 * | 10/2005 | Guheen | G06Q 90/20 | 705/323 |
| 6,983,061 B2 * | 1/2006 | Ikegami | G07C 9/33 | 713/186 |
| 7,092,926 B2 * | 8/2006 | Cerrato | G06F 21/316 | 706/14 |
| 7,130,452 B2 * | 10/2006 | Bolle | G06Q 20/388 | 707/999.009 |
| 7,133,792 B2 * | 11/2006 | Murakami | G07C 9/257 | 713/186 |
| 7,139,916 B2 * | 11/2006 | Billingsley | H04L 9/3297 | 380/255 |
| 7,158,118 B2 * | 1/2007 | Liberty | G06F 3/0383 | |
| 7,236,156 B2 * | 6/2007 | Liberty | A61B 5/1171 | 345/157 |
| 7,245,218 B2 * | 7/2007 | Ikehara | G06F 3/03543 | 340/552 |
| 7,366,919 B1 * | 4/2008 | Sobel | H04L 51/222 | |
| 7,395,436 B1 * | 7/2008 | Nemovicher | H04L 63/0823 | 726/28 |
| 7,441,429 B1 * | 10/2008 | Nucci | H04L 63/1416 | 709/224 |
| 7,494,061 B2 * | 2/2009 | Reinhold | H04L 63/30 | 235/382 |
| 7,523,191 B1 * | 4/2009 | Thomas | G06F 11/3476 | 709/224 |
| 7,535,456 B2 * | 5/2009 | Liberty | H04N 21/42222 | 345/157 |
| 7,606,915 B1 * | 10/2009 | Calinov | G06F 21/36 | 709/229 |
| 7,796,013 B2 * | 9/2010 | Murakami | G07F 7/1008 | 340/5.82 |
| 7,815,106 B1 * | 10/2010 | McConnell | G06Q 30/02 | 235/377 |
| 7,831,522 B1 * | 11/2010 | Satish | G06Q 20/3821 | 705/76 |
| 7,860,870 B2 * | 12/2010 | Sadagopan | G06F 16/9535 | 707/758 |
| 8,125,312 B2 * | 2/2012 | Orr | G08C 19/00 | 340/5.31 |
| 8,156,324 B1 * | 4/2012 | Shnowske | A63F 13/87 | 463/36 |
| 8,170,953 B1 * | 5/2012 | Tullis | G06Q 20/085 | 705/77 |
| 8,171,085 B1 * | 5/2012 | Tevanian, Jr. | H04L 63/12 | 713/176 |
| 8,201,222 B2 * | 6/2012 | Inoue | H04L 63/08 | 726/4 |
| 8,284,764 B1 * | 10/2012 | Nucci | H04L 41/12 | 370/352 |
| 8,285,658 B1 * | 10/2012 | Kellas-Dicks | G06F 21/316 | 706/45 |
| 8,402,533 B2 * | 3/2013 | LeBeau | G06F 21/629 | 726/17 |
| 8,417,960 B2 * | 4/2013 | Takahashi | H04L 9/0866 | 340/5.82 |
| 8,433,785 B2 * | 4/2013 | Awadallah | G06F 11/3485 | 709/224 |
| 8,449,393 B2 * | 5/2013 | Sobel | G06F 21/32 | 340/5.82 |
| 8,499,245 B1 * | 7/2013 | Froment | H04L 67/535 | 715/744 |
| 8,510,113 B1 * | 8/2013 | Conkie | G10L 13/00 | 704/270.1 |
| 8,548,208 B2 * | 10/2013 | Schultz | G06F 21/32 | 340/5.82 |
| 8,549,629 B1 * | 10/2013 | McCreesh | G06F 21/316 | 726/22 |
| 8,555,077 B2 * | 10/2013 | Davis | H04L 63/0861 | 726/28 |
| 8,615,807 B1 * | 12/2013 | Higbee | H04L 63/20 | 726/25 |
| 8,621,209 B1 * | 12/2013 | Johansson | H04L 63/08 | 713/170 |
| 8,635,703 B1 * | 1/2014 | Belani | H04L 63/1483 | 726/25 |
| 8,745,729 B2 * | 6/2014 | Poluri | G06F 21/31 | 726/21 |
| 8,776,196 B1 * | 7/2014 | Oliver | H04L 63/1483 | 726/5 |
| 8,803,797 B2 * | 8/2014 | Scott | G06F 3/04142 | 345/174 |
| 8,819,812 B1 * | 8/2014 | Weber | G06F 3/017 | 726/19 |
| 8,832,823 B2 * | 9/2014 | Boss | G06F 21/36 | 726/16 |
| 8,880,441 B1 * | 11/2014 | Chen | G06N 20/00 | 706/12 |
| 8,904,479 B1 * | 12/2014 | Johansson | G06F 21/36 | 382/181 |
| 8,990,959 B2 * | 3/2015 | Zhu | G06T 19/20 | 726/19 |
| 9,154,534 B1 * | 10/2015 | Gayles | H04L 65/612 | |
| 9,174,123 B2 * | 11/2015 | Nasiri | G06F 1/1694 | |
| 9,195,351 B1 * | 11/2015 | Rosenberg | G06F 1/1626 | |
| 9,203,860 B1 * | 12/2015 | Casillas | H04L 63/1441 | |
| 9,282,112 B2 * | 3/2016 | Filatov | H04L 63/1408 | |
| 9,301,140 B1 * | 3/2016 | Costigan | H04L 67/306 | |
| 9,304,915 B2 * | 4/2016 | Adams | G06F 12/0891 | |
| 9,355,231 B2 * | 5/2016 | Disraeli | H04L 63/083 | |
| 9,355,234 B1 * | 5/2016 | Magi Shaashua | G06F 21/32 | |
| 9,430,629 B1 * | 8/2016 | Ziraknejad | G06F 16/583 | |
| 9,529,987 B2 * | 12/2016 | Deutschmann | G06F 21/31 | |
| 9,589,120 B2 * | 3/2017 | Samuel | G06F 21/32 | |
| 9,654,485 B1 * | 5/2017 | Neumann | H04L 63/1416 | |
| 9,710,316 B1 * | 7/2017 | Chheda | G06F 9/547 | |
| 9,832,192 B2 * | 11/2017 | Alonso Cebrian | H04L 63/0869 | |
| 9,927,883 B1 * | 3/2018 | Lin | G06F 3/03543 | |
| 9,971,878 B2 * | 5/2018 | Nachenberg | G06Q 30/00 | |
| 10,027,707 B2 * | 7/2018 | Benson | H04L 63/1483 | |
| 10,158,677 B1 * | 12/2018 | DiCorpo | H04L 63/145 | |
| 10,193,923 B2 * | 1/2019 | Wright | H04L 61/301 | |
| 10,237,302 B1 * | 3/2019 | Kras | H04L 63/1483 | |
| 10,970,394 B2 * | 4/2021 | Kedem | G06F 21/566 | |

(56) References Cited

U.S. PATENT DOCUMENTS

| | | | | |
|---|---|---|---|---|
| 11,210,674 B2* | 12/2021 | Novick | | H04W 12/122 |
| 11,606,353 B2* | 3/2023 | Zaloum | | H04L 51/42 |
| 2001/0004733 A1* | 6/2001 | Eldering | | G06Q 30/0268 |
| | | | | 725/35 |
| 2002/0023229 A1* | 2/2002 | Hangai | | G06F 21/32 |
| | | | | 726/21 |
| 2002/0089412 A1* | 7/2002 | Heger | | G06F 21/32 |
| | | | | 340/5.82 |
| 2003/0033526 A1* | 2/2003 | French | | H04L 63/105 |
| | | | | 713/168 |
| 2003/0074201 A1* | 4/2003 | Grashey | | G10L 17/22 |
| | | | | 704/E17.015 |
| 2003/0137494 A1* | 7/2003 | Tulbert | | G06F 3/0488 |
| | | | | 345/173 |
| 2003/0149803 A1* | 8/2003 | Wilson | | G06F 3/0346 |
| | | | | 710/1 |
| 2003/0212811 A1* | 11/2003 | Thornton | | G09G 5/001 |
| | | | | 709/231 |
| 2004/0015714 A1* | 1/2004 | Abraham | | H04L 67/535 |
| | | | | 726/4 |
| 2004/0017355 A1* | 1/2004 | Shim | | G06F 3/0338 |
| | | | | 345/157 |
| 2004/0021643 A1* | 2/2004 | Hoshino | | G06F 3/03547 |
| | | | | 345/173 |
| 2004/0034784 A1* | 2/2004 | Fedronic | | G06Q 20/341 |
| | | | | 713/186 |
| 2004/0062423 A1* | 4/2004 | Doi | | G06V 40/16 |
| | | | | 382/118 |
| 2004/0111523 A1* | 6/2004 | Hall | | H04L 69/163 |
| | | | | 709/230 |
| 2004/0123156 A1* | 6/2004 | Hammond, II | | H04L 63/08 |
| | | | | 726/4 |
| 2004/0128240 A1* | 7/2004 | Yusin | | G07F 7/08 |
| | | | | 705/42 |
| 2004/0143737 A1* | 7/2004 | Teicher | | G06K 7/1095 |
| | | | | 713/167 |
| 2004/0186882 A1* | 9/2004 | Ting | | H04L 67/306 |
| | | | | 709/202 |
| 2004/0187037 A1* | 9/2004 | Checco | | G06F 21/31 |
| | | | | 382/115 |
| 2004/0221171 A1* | 11/2004 | Ahmed | | G06F 21/316 |
| | | | | 726/23 |
| 2005/0008148 A1* | 1/2005 | Jacobson | | G06Q 10/10 |
| | | | | 713/168 |
| 2005/0060138 A1* | 3/2005 | Wang | | G06F 40/289 |
| | | | | 704/1 |
| 2005/0179657 A1* | 8/2005 | Russo | | G06F 3/042 |
| | | | | 345/163 |
| 2005/0289264 A1* | 12/2005 | Illowsky | | G06F 9/4843 |
| | | | | 710/72 |
| 2006/0006803 A1* | 1/2006 | Huang | | H01J 61/0672 |
| | | | | 313/607 |
| 2006/0080263 A1* | 4/2006 | Willis | | H04L 63/10 |
| | | | | 705/76 |
| 2006/0090073 A1* | 4/2006 | Steinberg | | G06F 21/31 |
| | | | | 713/170 |
| 2006/0123101 A1* | 6/2006 | Buccella | | G06F 21/552 |
| | | | | 709/223 |
| 2006/0143454 A1* | 6/2006 | Walmsley | | G06F 21/85 |
| | | | | 713/170 |
| 2006/0195328 A1* | 8/2006 | Abraham | | G06Q 30/02 |
| | | | | 235/382 |
| 2006/0215886 A1* | 9/2006 | Black | | G06V 40/30 |
| | | | | 382/124 |
| 2006/0238490 A1* | 10/2006 | Stanley | | G06F 3/0421 |
| | | | | 345/156 |
| 2006/0239430 A1* | 10/2006 | Gue | | G06Q 30/06 |
| | | | | 379/201.01 |
| 2006/0280339 A1* | 12/2006 | Cho | | G07C 9/37 |
| | | | | 382/115 |
| 2006/0282660 A1* | 12/2006 | Varghese | | G07F 7/1083 |
| | | | | 713/155 |
| 2006/0284969 A1* | 12/2006 | Kim | | H04M 1/67 |
| | | | | 348/14.01 |
| 2006/0287079 A1* | 12/2006 | Nonaka | | G07F 17/32 |
| | | | | 463/29 |
| 2007/0118804 A1* | 5/2007 | Raciborski | | G06F 11/3438 |
| | | | | 715/745 |
| 2007/0156443 A1* | 7/2007 | Gurvey | | G06Q 30/02 |
| | | | | 705/64 |
| 2007/0174082 A1* | 7/2007 | Singh | | H04W 4/02 |
| | | | | 705/44 |
| 2007/0183633 A1* | 8/2007 | Hoffmann | | G06V 40/16 |
| | | | | 382/116 |
| 2007/0198286 A1* | 8/2007 | Tomita | | G06F 21/32 |
| | | | | 713/182 |
| 2007/0214426 A1* | 9/2007 | Ruelle | | H04N 21/47 |
| | | | | 715/767 |
| 2007/0226797 A1* | 9/2007 | Thompson | | H04L 63/1416 |
| | | | | 726/22 |
| 2007/0236330 A1* | 10/2007 | Cho | | G06F 21/305 |
| | | | | 340/5.54 |
| 2007/0240230 A1* | 10/2007 | O'Connell | | G06F 21/55 |
| | | | | 726/28 |
| 2007/0241861 A1* | 10/2007 | Venkatanna | | G06F 21/40 |
| | | | | 340/5.52 |
| 2007/0250920 A1* | 10/2007 | Lindsay | | G06F 21/31 |
| | | | | 726/7 |
| 2007/0255821 A1* | 11/2007 | Ge | | H04L 67/54 |
| | | | | 709/224 |
| 2007/0266305 A1* | 11/2007 | Cong | | G06Q 30/02 |
| | | | | 715/700 |
| 2007/0271466 A1* | 11/2007 | Mak | | G06F 21/316 |
| | | | | 713/184 |
| 2007/0283416 A1* | 12/2007 | Renaud | | G06Q 20/40 |
| | | | | 726/2 |
| 2008/0046982 A1* | 2/2008 | Parkinson | | H04L 9/0891 |
| | | | | 726/5 |
| 2008/0059474 A1* | 3/2008 | Lim | | G06F 16/176 |
| | | | | 707/E17.106 |
| 2008/0066167 A1* | 3/2008 | Andri | | G06F 21/31 |
| | | | | 726/5 |
| 2008/0068343 A1* | 3/2008 | Hoshino | | G06F 3/016 |
| | | | | 345/173 |
| 2008/0084972 A1* | 4/2008 | Burke | | H04L 63/126 |
| | | | | 379/88.02 |
| 2008/0091453 A1* | 4/2008 | Meehan | | G07F 19/207 |
| | | | | 705/317 |
| 2008/0091639 A1* | 4/2008 | Davis | | G06Q 30/02 |
| 2008/0092209 A1* | 4/2008 | Davis | | G06F 21/32 |
| | | | | 726/2 |
| 2008/0092245 A1* | 4/2008 | Alward | | G06F 21/316 |
| | | | | 726/28 |
| 2008/0097851 A1* | 4/2008 | Bemmel | | G06Q 30/0236 |
| | | | | 705/14.1 |
| 2008/0098456 A1* | 4/2008 | Alward | | G06F 21/316 |
| | | | | 726/1 |
| 2008/0120717 A1* | 5/2008 | Shakkarwar | | G06F 21/34 |
| | | | | 726/18 |
| 2008/0136790 A1* | 6/2008 | Hio | | G06F 3/04817 |
| | | | | 345/173 |
| 2008/0162449 A1* | 7/2008 | Chao-Yu | | G06F 16/248 |
| | | | | 707/999.005 |
| 2008/0183745 A1* | 7/2008 | Cancel | | G06Q 30/02 |
| | | | | 707/999.102 |
| 2008/0192005 A1* | 8/2008 | Elgoyhen | | G06F 3/017 |
| | | | | 345/158 |
| 2008/0200310 A1* | 8/2008 | Tagliabue | | A61B 5/7405 |
| | | | | 342/357.57 |
| 2008/0211766 A1* | 9/2008 | Westerman | | G06F 3/0482 |
| | | | | 345/156 |
| 2008/0215576 A1* | 9/2008 | Zhao | | G06F 16/337 |
| | | | | 707/999.005 |
| 2008/0263636 A1* | 10/2008 | Gusler | | H04L 63/1466 |
| | | | | 726/4 |
| 2008/0298588 A1* | 12/2008 | Shakkarwar | | H04L 63/08 |
| | | | | 380/255 |

(56) References Cited

U.S. PATENT DOCUMENTS

| | | | | |
|---|---|---|---|---|
| 2008/0301808 A1* | 12/2008 | Calo | H04L 63/1408 | 726/23 |
| 2008/0306897 A1* | 12/2008 | Liu | G06N 5/02 | 706/53 |
| 2008/0307236 A1* | 12/2008 | Lu | H04L 9/3226 | 713/184 |
| 2008/0309616 A1* | 12/2008 | Massengill | A61B 5/16 | 345/156 |
| 2008/0319841 A1* | 12/2008 | Oliver | G06Q 30/0255 | 705/14.47 |
| 2009/0006532 A1* | 1/2009 | Sinn | H04L 63/1408 | 709/225 |
| 2009/0037983 A1* | 2/2009 | Chiruvolu | G06F 21/31 | 726/4 |
| 2009/0038010 A1* | 2/2009 | Ma | G06F 11/3672 | 726/23 |
| 2009/0049555 A1* | 2/2009 | Cho | G06F 21/31 | 726/26 |
| 2009/0083850 A1* | 3/2009 | Fadell | H04L 9/3231 | 726/19 |
| 2009/0089879 A1* | 4/2009 | Wang | G06F 21/53 | 726/24 |
| 2009/0094311 A1* | 4/2009 | Awadallah | H04L 63/1441 | 709/202 |
| 2009/0132395 A1* | 5/2009 | Lam | G06F 16/9535 | 705/30 |
| 2009/0133106 A1* | 5/2009 | Bentley | G06F 21/32 | 726/5 |
| 2009/0134972 A1* | 5/2009 | Wu, Jr. | G06F 21/31 | 340/5.82 |
| 2009/0157792 A1* | 6/2009 | Fiatal | H04L 63/08 | 709/201 |
| 2009/0172551 A1* | 7/2009 | Kane | G06Q 30/02 | 715/733 |
| 2009/0177562 A1* | 7/2009 | Peace | G06Q 40/02 | 709/204 |
| 2009/0189736 A1* | 7/2009 | Hayashi | G06F 21/32 | 340/5.81 |
| 2009/0199296 A1* | 8/2009 | Xie | G06F 21/316 | 726/23 |
| 2009/0203355 A1* | 8/2009 | Clark | G06F 21/81 | 455/411 |
| 2009/0227232 A1* | 9/2009 | Matas | H04M 1/665 | 455/411 |
| 2009/0241188 A1* | 9/2009 | Komura | H04L 63/1416 | 726/22 |
| 2009/0254336 A1* | 10/2009 | Dumais | G06F 9/451 | 704/9 |
| 2009/0281979 A1* | 11/2009 | Tysowski | G06F 3/0237 | 707/999.005 |
| 2009/0293119 A1* | 11/2009 | Jonsson | G06V 40/20 | 726/19 |
| 2009/0299967 A1* | 12/2009 | Li | G06Q 30/02 | |
| 2009/0300589 A1* | 12/2009 | Watters | G06Q 40/00 | 717/140 |
| 2009/0303204 A1* | 12/2009 | Nasiri | A63F 13/92 | 345/184 |
| 2009/0320123 A1* | 12/2009 | Yu | H04L 9/3226 | 726/16 |
| 2010/0007632 A1* | 1/2010 | Yamazaki | G06F 1/1616 | 345/175 |
| 2010/0040293 A1* | 2/2010 | Hermann | G06F 21/31 | 382/218 |
| 2010/0042387 A1* | 2/2010 | Gibbon | G06Q 30/02 | 703/6 |
| 2010/0042403 A1* | 2/2010 | Chandrasekar | G06Q 30/02 | 704/9 |
| 2010/0042954 A1* | 2/2010 | Rosenblatt | G06F 3/0482 | 715/863 |
| 2010/0046806 A1* | 2/2010 | Baughman | G06F 21/316 | 345/619 |
| 2010/0070405 A1* | 3/2010 | Joa | G06Q 20/20 | 705/40 |
| 2010/0077470 A1* | 3/2010 | Kozat | H04L 63/14 | 726/11 |
| 2010/0082747 A1* | 4/2010 | Yue | G06F 16/954 | 709/227 |
| 2010/0082998 A1* | 4/2010 | Kohavi | G06F 21/36 | 713/182 |
| 2010/0097324 A1* | 4/2010 | Anson | G06F 3/04883 | 345/173 |
| 2010/0115610 A1* | 5/2010 | Tredoux | G06F 21/316 | 726/19 |
| 2010/0122082 A1* | 5/2010 | Deng | H04L 63/126 | 713/159 |
| 2010/0125816 A1* | 5/2010 | Bezos | G06F 3/017 | 715/863 |
| 2010/0138370 A1* | 6/2010 | Wu | H04H 60/33 | 707/769 |
| 2010/0164897 A1* | 7/2010 | Morin | G06F 3/0346 | 345/173 |
| 2010/0171753 A1* | 7/2010 | Kwon | G06F 3/04886 | 345/173 |
| 2010/0197352 A1* | 8/2010 | Runstedler | G06F 21/31 | 455/566 |
| 2010/0203876 A1* | 8/2010 | Krishnaswamy | G06Q 30/02 | 455/418 |
| 2010/0225443 A1* | 9/2010 | Bayram | G06F 21/36 | 340/5.83 |
| 2010/0245553 A1* | 9/2010 | Schuler | G06V 40/12 | 382/128 |
| 2010/0262688 A1* | 10/2010 | Hussain | H04L 63/1466 | 709/224 |
| 2010/0269165 A1* | 10/2010 | Chen | G06F 21/36 | 345/157 |
| 2010/0281539 A1* | 11/2010 | Burns | H04L 63/1441 | 726/13 |
| 2010/0284532 A1* | 11/2010 | Burnett | G06F 21/6245 | 341/51 |
| 2010/0287229 A1* | 11/2010 | Hauser | H04L 67/535 | 709/206 |
| 2010/0299292 A1* | 11/2010 | Collazo | G06F 21/577 | 706/14 |
| 2010/0321304 A1* | 12/2010 | Rofougaran | G06F 3/046 | 345/173 |
| 2010/0325721 A1* | 12/2010 | Bandyopadhyay | G06F 3/04842 | 726/19 |
| 2010/0328074 A1* | 12/2010 | Johnson | G06F 21/31 | 340/573.1 |
| 2011/0010209 A1* | 1/2011 | McNally | G06N 20/00 | 706/47 |
| 2011/0012829 A1* | 1/2011 | Yao | G06F 3/045 | 345/157 |
| 2011/0016320 A1* | 1/2011 | Bergsten | H04L 63/083 | 713/170 |
| 2011/0016534 A1* | 1/2011 | Jakobsson | H04L 67/535 | 726/28 |
| 2011/0018828 A1* | 1/2011 | Wu | G06F 3/04883 | 345/173 |
| 2011/0023115 A1* | 1/2011 | Wright | G06F 21/552 | 726/22 |
| 2011/0029902 A1* | 2/2011 | Bailey | G06Q 30/02 | 715/764 |
| 2011/0039529 A1* | 2/2011 | Kim | H04W 68/00 | 455/418 |
| 2011/0039602 A1* | 2/2011 | McNamara | G06F 3/017 | 345/173 |
| 2011/0043475 A1* | 2/2011 | Rigazio | H04N 21/42222 | 345/173 |
| 2011/0050394 A1* | 3/2011 | Zhang | G06F 21/32 | 340/5.82 |
| 2011/0055077 A1* | 3/2011 | French | G06Q 20/3255 | 705/39 |
| 2011/0063211 A1* | 3/2011 | Hoerl | H04W 24/00 | 345/157 |

(56) References Cited

U.S. PATENT DOCUMENTS

| | | | |
|---|---|---|---|
| 2011/0065504 A1* | 3/2011 | Dugan | A63F 13/816 463/31 |
| 2011/0066682 A1* | 3/2011 | Aldunate | H04L 67/75 709/204 |
| 2011/0082768 A1* | 4/2011 | Eisen | G06Q 30/0609 705/26.35 |
| 2011/0102570 A1* | 5/2011 | Wilf | G06F 3/017 345/156 |
| 2011/0105103 A1* | 5/2011 | Ullrich | H04M 1/72412 345/173 |
| 2011/0105859 A1* | 5/2011 | Popovic | A61B 5/318 600/301 |
| 2011/0113388 A1* | 5/2011 | Eisen | G06F 21/554 715/856 |
| 2011/0119370 A1* | 5/2011 | Huang | H04L 43/14 702/182 |
| 2011/0134240 A1* | 6/2011 | Anderson | H04W 4/38 348/143 |
| 2011/0154273 A1* | 6/2011 | Aburada | G03F 1/70 716/52 |
| 2011/0154497 A1* | 6/2011 | Bailey, Jr. | H04L 63/1433 726/25 |
| 2011/0159650 A1* | 6/2011 | Shiraishi | H01L 29/66681 438/269 |
| 2011/0159850 A1* | 6/2011 | Faith | G06Q 30/0207 455/411 |
| 2011/0162076 A1* | 6/2011 | Song | G06F 21/86 709/217 |
| 2011/0191820 A1* | 8/2011 | Ivey | G06F 21/36 382/284 |
| 2011/0193737 A1* | 8/2011 | Chiueh | G08C 23/02 341/176 |
| 2011/0196791 A1* | 8/2011 | Dominguez | G06Q 40/00 705/44 |
| 2011/0202453 A1* | 8/2011 | Issa | G06Q 20/4016 705/39 |
| 2011/0211682 A1* | 9/2011 | Singh | H04M 1/57 379/142.05 |
| 2011/0221684 A1* | 9/2011 | Rydenhag | G06F 3/0412 345/173 |
| 2011/0223888 A1* | 9/2011 | Esaki | G06F 21/32 455/411 |
| 2011/0225644 A1* | 9/2011 | Pullikottil | H04L 63/1425 726/11 |
| 2011/0246902 A1* | 10/2011 | Tsai | A63F 13/323 715/740 |
| 2011/0248941 A1* | 10/2011 | Abdo | G06F 3/0488 345/173 |
| 2011/0271342 A1* | 11/2011 | Chung | H04L 63/145 726/23 |
| 2011/0276414 A1* | 11/2011 | Subbarao | G06Q 20/102 705/40 |
| 2011/0286730 A1* | 11/2011 | Gallagher | G03B 17/00 396/53 |
| 2011/0300831 A1* | 12/2011 | Chin | H04W 12/06 345/173 |
| 2011/0304531 A1* | 12/2011 | Brooks | G06F 16/9537 345/156 |
| 2011/0320822 A1* | 12/2011 | Lind | G06F 21/316 713/182 |
| 2012/0005483 A1* | 1/2012 | Patvarczki | G06F 21/36 713/182 |
| 2012/0005719 A1* | 1/2012 | McDougal | G06F 21/562 709/224 |
| 2012/0007821 A1* | 1/2012 | Zaliva | G06F 3/04166 345/173 |
| 2012/0054834 A1* | 3/2012 | King | G06F 21/31 726/4 |
| 2012/0072982 A1* | 3/2012 | Ranganathan | G06Q 30/06 726/22 |
| 2012/0096555 A1* | 4/2012 | Mahaffey | G06F 21/562 726/25 |
| 2012/0101930 A1* | 4/2012 | Li | G06Q 40/00 705/35 |
| 2012/0102551 A1* | 4/2012 | Bidare | H04L 9/3226 726/4 |
| 2012/0113061 A1* | 5/2012 | Ikeda | G06F 3/04883 345/173 |
| 2012/0123932 A1* | 5/2012 | LeCuyer | G06Q 20/26 705/39 |
| 2012/0124662 A1* | 5/2012 | Baca | H04W 12/06 726/17 |
| 2012/0133055 A1* | 5/2012 | Machida | H01L 24/06 257/777 |
| 2012/0151044 A1* | 6/2012 | Luna | H04L 67/5682 709/224 |
| 2012/0151559 A1* | 6/2012 | Koudys | G06F 21/316 726/23 |
| 2012/0154173 A1* | 6/2012 | Chang | G08G 1/166 340/904 |
| 2012/0154273 A1* | 6/2012 | McDade, Sr. | G06F 3/041 345/157 |
| 2012/0154823 A1* | 6/2012 | Sakamoto | G03B 27/32 356/620 |
| 2012/0158503 A1* | 6/2012 | Mardikar | G06Q 30/0269 705/14.66 |
| 2012/0159599 A1* | 6/2012 | Szoke | G06F 21/35 726/7 |
| 2012/0164978 A1* | 6/2012 | Conti | H04W 12/06 455/411 |
| 2012/0167170 A1* | 6/2012 | Shi | G06F 21/316 726/2 |
| 2012/0167204 A1* | 6/2012 | Akka | G06F 21/36 715/862 |
| 2012/0174213 A1* | 7/2012 | Geiger | G06F 3/04883 726/19 |
| 2012/0188198 A1* | 7/2012 | Jeong | G06F 3/044 345/174 |
| 2012/0204257 A1* | 8/2012 | O'Connell | G06F 21/316 726/19 |
| 2012/0218193 A1* | 8/2012 | Weber | G09B 21/004 345/173 |
| 2012/0239557 A1* | 9/2012 | Weinflash | G06Q 40/02 705/39 |
| 2012/0246737 A1* | 9/2012 | Paxton | G06F 16/24578 726/27 |
| 2012/0252410 A1* | 10/2012 | Williams | G06F 21/36 455/411 |
| 2012/0278804 A1* | 11/2012 | Narayanasamy | H04L 47/15 718/1 |
| 2012/0278886 A1* | 11/2012 | Luna | H04L 63/1408 726/22 |
| 2012/0284380 A1* | 11/2012 | Anderson, III | G06F 9/45558 709/223 |
| 2012/0297476 A1* | 11/2012 | Zeljkovic | H04L 63/145 726/22 |
| 2013/0018796 A1* | 1/2013 | Kolhatkar | G06Q 20/405 705/44 |
| 2013/0024239 A1* | 1/2013 | Baker | G06Q 40/06 705/7.28 |
| 2013/0036416 A1* | 2/2013 | Raju | G06F 9/45558 718/1 |
| 2013/0061169 A1* | 3/2013 | Pearcy | G06F 11/328 715/788 |
| 2013/0076650 A1* | 3/2013 | Vik | G06F 3/04186 345/173 |
| 2013/0088434 A1* | 4/2013 | Masuda | G06F 3/0393 345/173 |
| 2013/0097682 A1* | 4/2013 | Zeljkovic | H04L 9/3234 726/7 |
| 2013/0097706 A1* | 4/2013 | Titonis | G06F 21/566 726/22 |
| 2013/0109944 A1* | 5/2013 | Sparacino | G16H 50/30 600/365 |
| 2013/0111586 A1* | 5/2013 | Jackson | G06F 21/316 726/23 |
| 2013/0132091 A1* | 5/2013 | Skerpac | G07C 9/37 704/273 |

(56) References Cited

U.S. PATENT DOCUMENTS

| | | | |
|---|---|---|---|
| 2013/0133055 A1* | 5/2013 | Ali | H04L 63/0861 726/7 |
| 2013/0135218 A1* | 5/2013 | Jain | G06F 3/0488 345/173 |
| 2013/0139248 A1* | 5/2013 | Rhee | G06F 3/0346 726/19 |
| 2013/0154999 A1* | 6/2013 | Guard | G06F 3/0487 345/174 |
| 2013/0162603 A1* | 6/2013 | Peng | G06F 3/0418 345/178 |
| 2013/0167212 A1* | 6/2013 | Azar | G06F 21/32 348/77 |
| 2013/0173737 A1* | 7/2013 | Liu | H04L 65/612 709/213 |
| 2013/0198832 A1* | 8/2013 | Draluk | G06F 21/316 726/16 |
| 2013/0212674 A1* | 8/2013 | Boger | G09B 21/008 726/17 |
| 2013/0226992 A1* | 8/2013 | Bapst | G06F 16/9574 709/203 |
| 2013/0237272 A1* | 9/2013 | Prasad | H01Q 1/245 342/372 |
| 2013/0239195 A1* | 9/2013 | Turgeman | G06F 21/316 726/19 |
| 2013/0239206 A1* | 9/2013 | Draluk | H04L 63/083 726/19 |
| 2013/0243208 A1* | 9/2013 | Fawer | A61B 5/162 381/57 |
| 2013/0254642 A1* | 9/2013 | Seo | G06F 16/955 715/205 |
| 2013/0282637 A1* | 10/2013 | Costigan | G06N 5/022 706/46 |
| 2013/0288647 A1* | 10/2013 | Turgeman | H04W 12/30 455/411 |
| 2013/0301830 A1* | 11/2013 | Bar-El | G06F 21/84 340/5.83 |
| 2013/0305357 A1* | 11/2013 | Ayyagari | H04L 41/069 726/22 |
| 2013/0312097 A1* | 11/2013 | Turnbull | H04L 63/1425 726/24 |
| 2013/0335349 A1* | 12/2013 | Ferren | G08C 17/02 345/173 |
| 2013/0346309 A1* | 12/2013 | Giori | G06Q 20/3223 705/43 |
| 2013/0346311 A1* | 12/2013 | Boding | G06Q 20/3227 705/44 |
| 2014/0033317 A1* | 1/2014 | Barber | G06Q 30/0609 709/224 |
| 2014/0041020 A1* | 2/2014 | Zhao | G06F 21/36 726/19 |
| 2014/0078061 A1* | 3/2014 | Simons | G06F 3/03543 345/163 |
| 2014/0078193 A1* | 3/2014 | Barnhoefer | G09G 3/3607 345/87 |
| 2014/0082369 A1* | 3/2014 | Waclawsky | G06F 21/62 713/189 |
| 2014/0111451 A1* | 4/2014 | Park | G06F 3/04883 345/173 |
| 2014/0114843 A1* | 4/2014 | Klein | G06F 21/566 705/39 |
| 2014/0118520 A1* | 5/2014 | Slaby | G06V 40/50 340/5.52 |
| 2014/0123275 A1* | 5/2014 | Azar | G06V 10/772 726/19 |
| 2014/0143304 A1* | 5/2014 | Hegarty | H04L 67/01 709/203 |
| 2014/0168093 A1* | 6/2014 | Lawrence | G06F 3/016 345/173 |
| 2014/0196119 A1* | 7/2014 | Hill | G06F 21/30 726/4 |
| 2014/0200953 A1* | 7/2014 | Mun | G06Q 10/04 705/7.28 |
| 2014/0223531 A1* | 8/2014 | Outwater | A61B 5/18 726/7 |
| 2014/0244499 A1* | 8/2014 | Gruner | G06Q 20/4014 705/42 |
| 2014/0250538 A1* | 9/2014 | Rapaport | G06F 21/31 726/28 |
| 2014/0259130 A1* | 9/2014 | Li | G06F 21/31 726/6 |
| 2014/0270571 A1* | 9/2014 | Dwan | H04N 1/00453 382/276 |
| 2014/0283059 A1* | 9/2014 | Sambamurthy | G06F 21/552 726/23 |
| 2014/0283068 A1* | 9/2014 | Call | H04L 63/0428 726/23 |
| 2014/0289833 A1* | 9/2014 | Briceno | H04W 12/06 726/5 |
| 2014/0310764 A1* | 10/2014 | Tippett | G06F 21/31 726/1 |
| 2014/0310805 A1* | 10/2014 | Kandekar | H04L 63/083 726/19 |
| 2014/0317028 A1* | 10/2014 | Turgeman | G06F 3/033 706/11 |
| 2014/0317726 A1* | 10/2014 | Turgeman | H04W 12/06 726/19 |
| 2014/0317734 A1* | 10/2014 | Valencia | G06F 21/552 726/22 |
| 2014/0317744 A1* | 10/2014 | Turgeman | H04W 12/122 726/23 |
| 2014/0325223 A1* | 10/2014 | Turgeman | G06F 21/31 713/168 |
| 2014/0325645 A1* | 10/2014 | Turgeman | G06F 3/04892 726/22 |
| 2014/0325646 A1* | 10/2014 | Turgeman | G06F 21/316 726/22 |
| 2014/0325682 A1* | 10/2014 | Turgeman | G06F 21/316 726/29 |
| 2014/0337786 A1* | 11/2014 | Luo | G06F 3/0425 715/773 |
| 2014/0344927 A1* | 11/2014 | Turgeman | G06F 21/31 726/22 |
| 2015/0002479 A1* | 1/2015 | Kawamura | G06F 3/0485 345/178 |
| 2015/0012920 A1* | 1/2015 | De Santis | G06F 9/45533 718/1 |
| 2015/0062078 A1* | 3/2015 | Christman | A61B 5/6897 345/174 |
| 2015/0081549 A1* | 3/2015 | Kimberg | G06Q 20/4016 705/44 |
| 2015/0091858 A1* | 4/2015 | Rosenberg | G06F 3/04144 345/174 |
| 2015/0101031 A1* | 4/2015 | Harjanto | G06F 3/017 726/7 |
| 2015/0128252 A1* | 5/2015 | Konami | G06F 21/31 726/17 |
| 2015/0146945 A1* | 5/2015 | Han | G06F 3/04883 382/125 |
| 2015/0205944 A1* | 7/2015 | Turgeman | G06F 3/041 726/7 |
| 2015/0205955 A1* | 7/2015 | Turgeman | H04L 63/10 726/7 |
| 2015/0205957 A1* | 7/2015 | Turgeman | G06F 21/554 726/23 |
| 2015/0205958 A1* | 7/2015 | Turgeman | H04L 63/0861 726/23 |
| 2015/0212843 A1* | 7/2015 | Turgeman | G06F 21/32 718/1 |
| 2015/0213244 A1* | 7/2015 | Lymberopoulos | G06V 40/70 726/19 |
| 2015/0213245 A1* | 7/2015 | Tartz | G06F 21/32 726/17 |
| 2015/0213246 A1* | 7/2015 | Turgeman | H04L 63/08 726/23 |
| 2015/0213251 A1* | 7/2015 | Turgeman | H04W 12/06 726/7 |
| 2015/0242601 A1* | 8/2015 | Griffiths | H04L 63/105 726/5 |

(56) References Cited

U.S. PATENT DOCUMENTS

| | | | |
|---|---|---|---|
| 2015/0256528 A1* | 9/2015 | Turgeman | H04L 67/535 726/28 |
| 2015/0256556 A1* | 9/2015 | Kaminsky | H04L 63/168 726/23 |
| 2015/0264572 A1* | 9/2015 | Turgeman | G06F 3/038 455/411 |
| 2015/0268768 A1* | 9/2015 | Woodhull | G06F 3/0418 345/168 |
| 2015/0279155 A1* | 10/2015 | Chun | G06Q 20/4016 463/25 |
| 2015/0310196 A1* | 10/2015 | Turgeman | H04W 12/06 726/19 |
| 2015/0348038 A1* | 12/2015 | Femrite | G06Q 20/4014 705/44 |
| 2015/0358317 A1* | 12/2015 | Deutschmann | H04W 12/065 713/186 |
| 2016/0006800 A1* | 1/2016 | Summers | H04L 67/1072 709/203 |
| 2016/0012465 A1* | 1/2016 | Sharp | G06Q 20/321 705/14.17 |
| 2016/0019546 A1* | 1/2016 | Eisen | G06F 21/44 705/44 |
| 2016/0034673 A1* | 2/2016 | Chandra | H04L 63/0861 726/7 |
| 2016/0042164 A1* | 2/2016 | Goldsmith | G06F 21/88 726/7 |
| 2016/0048937 A1* | 2/2016 | Mathura | G06Q 40/12 705/30 |
| 2016/0055324 A1* | 2/2016 | Agarwal | G06F 21/31 726/17 |
| 2016/0057623 A1* | 2/2016 | Dutt | H04W 12/126 455/411 |
| 2016/0077620 A1* | 3/2016 | Choi | G06F 3/041 345/173 |
| 2016/0087952 A1* | 3/2016 | Tartz | H04W 12/06 455/411 |
| 2016/0109969 A1* | 4/2016 | Keating | G06F 3/03547 345/173 |
| 2016/0155126 A1* | 6/2016 | D'Uva | G06Q 20/4016 705/44 |
| 2016/0164906 A1* | 6/2016 | Pinney Wood | G06F 21/552 726/25 |
| 2016/0174044 A1* | 6/2016 | Jones | H04W 4/029 455/424 |
| 2016/0179245 A1* | 6/2016 | Johansson | G06F 3/0447 345/174 |
| 2016/0182503 A1* | 6/2016 | Cheng | H04W 12/082 726/7 |
| 2016/0191237 A1* | 6/2016 | Roth | H04L 9/0891 380/278 |
| 2016/0196414 A1* | 7/2016 | Stuntebeck | G01P 15/0802 726/17 |
| 2016/0197918 A1* | 7/2016 | Turgeman | G06F 21/316 726/4 |
| 2016/0209948 A1* | 7/2016 | Tulbert | G06V 10/10 |
| 2016/0226865 A1* | 8/2016 | Chen | H04W 12/068 |
| 2016/0241555 A1* | 8/2016 | Vo | H04L 63/0861 |
| 2016/0294837 A1* | 10/2016 | Turgeman | G06F 21/316 |
| 2016/0300049 A1* | 10/2016 | Guedalia | G06V 30/1985 |
| 2016/0300054 A1* | 10/2016 | Turgeman | G06F 21/36 |
| 2016/0306974 A1* | 10/2016 | Turgeman | H04L 63/08 |
| 2016/0307191 A1* | 10/2016 | Turgeman | G06F 21/316 |
| 2016/0307201 A1* | 10/2016 | Turgeman | G06F 21/316 |
| 2016/0328572 A1* | 11/2016 | Valacich | A61B 5/164 |
| 2016/0342826 A1* | 11/2016 | Apostolos | H04W 12/065 |
| 2016/0344783 A1* | 11/2016 | Kushimoto | H04N 21/2743 |
| 2016/0364138 A1* | 12/2016 | Luo | G06F 3/0216 |
| 2016/0371476 A1* | 12/2016 | Turgeman | G06F 3/04842 |
| 2017/0012988 A1* | 1/2017 | Turgeman | H04W 12/122 |
| 2017/0017781 A1* | 1/2017 | Turgeman | H04L 63/08 |
| 2017/0032114 A1* | 2/2017 | Turgeman | H04W 12/06 |
| 2017/0034210 A1* | 2/2017 | Talmor | H04L 63/1416 |
| 2017/0048272 A1* | 2/2017 | Yamamura | H04L 63/10 |
| 2017/0054702 A1* | 2/2017 | Turgeman | G06F 21/31 |
| 2017/0063858 A1* | 3/2017 | Bandi | G06F 21/316 |
| 2017/0076089 A1* | 3/2017 | Turgeman | G06F 3/04812 |
| 2017/0085587 A1* | 3/2017 | Turgeman | G06F 3/0489 |
| 2017/0090418 A1* | 3/2017 | Tsang | G03H 1/0011 |
| 2017/0091450 A1* | 3/2017 | Turgeman | H04L 63/145 |
| 2017/0127197 A1* | 5/2017 | Mülder | H04R 25/558 |
| 2017/0140279 A1* | 5/2017 | Turgeman | G06N 20/00 |
| 2017/0149958 A1* | 5/2017 | Xian | H04M 1/6058 |
| 2017/0154366 A1* | 6/2017 | Turgeman | G06F 21/316 |
| 2017/0177999 A1* | 6/2017 | Novik | G06V 40/70 |
| 2017/0193526 A1* | 7/2017 | Turgeman | G06Q 30/0185 |
| 2017/0195354 A1* | 7/2017 | Kesin | H04L 67/535 |
| 2017/0195356 A1* | 7/2017 | Turgeman | H04L 63/08 |
| 2017/0221064 A1* | 8/2017 | Turgeman | H04W 12/06 |
| 2017/0237765 A1* | 8/2017 | Oberheide | H04L 63/1483 726/4 |
| 2017/0302340 A1* | 10/2017 | Berlin | H04W 4/80 |
| 2017/0318046 A1* | 11/2017 | Weidman | H04L 63/1433 |
| 2017/0364674 A1* | 12/2017 | Grubbs | G06F 21/36 |
| 2017/0364919 A1* | 12/2017 | Ranganath | G06Q 20/20 |
| 2018/0004948 A1* | 1/2018 | Martin | H04L 63/1425 |
| 2018/0012003 A1* | 1/2018 | Asulin | G06F 21/36 |
| 2018/0012227 A1* | 1/2018 | Tunnell | G06Q 20/40145 |
| 2018/0034850 A1* | 2/2018 | Turgeman | G06Q 30/0275 |
| 2018/0046792 A1* | 2/2018 | Toqan | G06V 40/70 |
| 2018/0082683 A1* | 3/2018 | Chen | G06F 21/6263 |
| 2018/0095596 A1* | 4/2018 | Turgeman | G06F 3/0346 |
| 2018/0097841 A1* | 4/2018 | Stolarz | H04K 1/00 |
| 2018/0103047 A1* | 4/2018 | Turgeman | G06Q 20/4014 |
| 2018/0107836 A1* | 4/2018 | Boger | G06F 21/36 |
| 2018/0115899 A1* | 4/2018 | Kedem | G06F 21/31 |
| 2018/0121640 A1* | 5/2018 | Turgeman | G06F 3/017 |
| 2018/0124082 A1* | 5/2018 | Siadati | H04L 63/1425 |
| 2018/0160309 A1* | 6/2018 | Turgeman | G06F 3/041 |
| 2018/0183827 A1* | 6/2018 | Zorlular | H04L 63/1416 |
| 2018/0302425 A1* | 10/2018 | Esman, Sr. | G06N 20/00 |
| 2018/0314816 A1* | 11/2018 | Turgeman | G06F 21/40 |
| 2018/0349583 A1* | 12/2018 | Turgeman | H04L 63/0861 |
| 2018/0350144 A1* | 12/2018 | Rathod | G06Q 20/3224 |
| 2018/0373780 A1* | 12/2018 | Pascarella | G06F 16/245 |
| 2019/0028497 A1* | 1/2019 | Karabchevsky | H04L 63/1425 |
| 2019/0057200 A1* | 2/2019 | Sabag | G06Q 20/40145 |
| 2019/0121956 A1* | 4/2019 | Turgeman | G06F 21/316 |
| 2019/0124068 A1* | 4/2019 | Anders | H04L 63/083 |
| 2019/0156034 A1* | 5/2019 | Kedem | G06Q 20/16 |
| 2019/0158535 A1* | 5/2019 | Kedem | H04W 12/12 |
| 2019/0220863 A1* | 7/2019 | Novick | G06Q 20/10 |
| 2019/0236391 A1* | 8/2019 | Novik | G06F 18/217 |
| 2019/0272025 A1* | 9/2019 | Turgeman | G06F 3/04812 |
| 2019/0342328 A1* | 11/2019 | Rivner | G06F 3/041 |
| 2019/0342329 A1* | 11/2019 | Turgeman | G06F 3/0488 |
| 2020/0012770 A1* | 1/2020 | Turgeman | G06F 21/6245 |
| 2020/0045044 A1* | 2/2020 | Turgeman | G06F 3/03543 |
| 2020/0273040 A1* | 8/2020 | Novick | G06Q 20/4016 |
| 2021/0004451 A1* | 1/2021 | Novik | H04W 12/06 |
| 2021/0110014 A1* | 4/2021 | Turgeman | G06F 11/3419 |
| 2023/0199120 A1* | 6/2023 | Panchaksharaiah | H04L 65/4015 |

\* cited by examiner

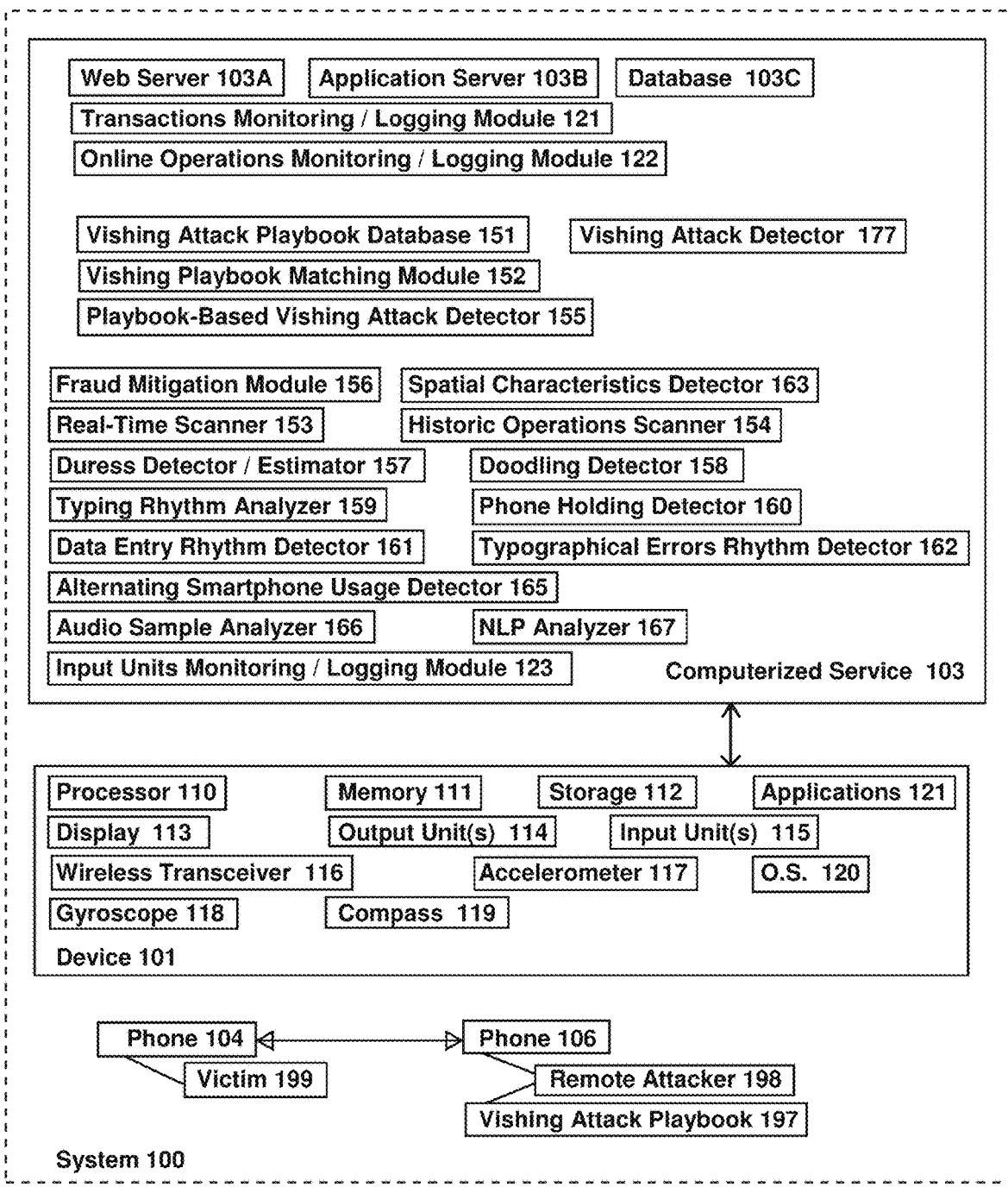

DEVICE, SYSTEM, AND METHOD OF DETECTING VISHING ATTACKS

CROSS-REFERENCE TO RELATED APPLICATIONS

This application is a Continuation of U.S. Ser. No. 17/359,579, filed on Jun. 27, 2021, which is hereby incorporated by reference in its entirety.

The above-mentioned U.S. Ser. No. 17/359,579 is a Continuation of U.S. Ser. No. 16/188,312, filed on Nov. 13, 2018, now abandoned, which is hereby incorporated by reference in its entirety; which is a Continuation-in-Part (CIP) of U.S. Ser. No. 15/819,400, filed on Nov. 21, 2017, now patent number U.S. Pat. No. 10,970,394 (issued on Apr. 6, 2021), which is hereby incorporated by reference in its entirety.

The above-mentioned U.S. Ser. No. 17/359,579 is also a Continuation-in-Part (CIP) of U.S. Ser. No. 16/872,381, filed on May 12, 2020, now patent number U.S. Pat. No. 11,210,674 (issued on Dec. 28, 2021), which is hereby incorporated by reference in its entirety.

The above-mentioned U.S. Ser. No. 16/872,381 is a Continuation of U.S. Ser. No. 16/242,015, filed on Jan. 8, 2019, now patent number U.S. Pat. No. 10,685,355 (issued on Jun. 16, 2020), which is hereby incorporated by reference in its entirety.

The above-mentioned U.S. Ser. No. 16/242,015 claims benefit and priority from U.S. 62/621,600, filed on Jan. 25, 2018, which is hereby incorporated by reference in its entirety.

The above-mentioned U.S. Ser. No. 16/242,015 is a Continuation-in-Part (CIP) of U.S. Ser. No. 16/057,825, filed on Aug. 8, 2018, now patent number U.S. Pat. No. 10,523,680 (issued on Dec. 31, 2019), which is hereby incorporated by reference in its entirety; which is a Continuation of U.S. Ser. No. 15/203,817, filed on Jul. 7, 2016, now patent number U.S. Pat. No. 10,069,837 (issued on Sep. 4, 2018), which is hereby incorporated by reference in its entirety; which claims priority and benefit from U.S. 62/190,264, filed on Jul. 9, 2015, which is hereby incorporated by reference in its entirety.

The above-mentioned U.S. Ser. No. 16/242,015 is also a Continuation-in-Part (CIP) of U.S. Ser. No. 15/885,819, filed on Feb. 1, 2018, now patent number U.S. Pat. No. 10,834,590 (issued on Nov. 10, 2020), which is hereby incorporated by reference in its entirety.

The above-mentioned U.S. Ser. No. 15/885,819 is a Continuation-in-Part (CIP) of U.S. Ser. No. 14/675,764, filed on Apr. 1, 2015, now abandoned, which is hereby incorporated by reference in its entirety.

The above-mentioned U.S. Ser. No. 14/675,764 claims priority and benefit from U.S. 61/973,855, filed on Apr. 2, 2014, which is hereby incorporated by reference in its entirety.

The above-mentioned U.S. Ser. No. 14/675,764 is a Continuation-in-Part (CIP) of U.S. Ser. No. 14/566,723, filed on Dec. 11, 2014, now patent number U.S. Pat. No. 9,071,969 (issued on Jun. 30, 2015); which is a Continuation of U.S. Ser. No. 13/922,271, filed on Jun. 20, 2013, now patent number U.S. Pat. No. 8,938,787 (issued on Jan. 20, 2015); which is a Continuation-in-Part (CIP) of U.S. Ser. No. 13/877,676, filed on Apr. 4, 2013, now patent number U.S. Pat. No. 9,069,942 (issued on Jun. 30, 2015); which is a National Stage of PCT International Application number PCT/IL2011/000907, having an International Filing Date of Nov. 29, 2011; which claims priority and benefit from U.S. 61/417,479, filed on Nov. 29, 2010; all of which are hereby incorporated by reference in their entirety.

The above-mentioned U.S. Ser. No. 14/675,764 is a Continuation-in-Part (CIP) of U.S. Ser. No. 14/320,653, filed on Jul. 1, 2014, now patent number U.S. Pat. No. 9,275,337 (issued on Mar. 1, 2016); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/320,656, filed on Jul. 1, 2014, now patent number U.S. Pat. No. 9,665,703 (issued on May 30, 2017); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,393, filed on Jul. 8, 2014, now patent number U.S. Pat. No. 9,531,733 (issued on Dec. 27, 2016); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,394, filed on Jul. 8, 2014, now patent number U.S. Pat. No. 9,547,766 (issued on Jan. 17, 2017); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,395, filed on Jul. 8, 2014, now patent number U.S. Pat. No. 9,621,567 (issued on Apr. 11, 2017); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,396, filed on Jul. 8, 2014, now abandoned; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,397, filed on Jul. 8, 2014, now patent number U.S. Pat. No. 9,450,971 (issued on Sep. 20, 2016); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,398, filed on Jul. 8, 2014, now patent number U.S. Pat. No. 9,477,826 (issued on Oct. 25, 2016); which claims priority and benefit from U.S. 61/843,915, filed on Jul. 9, 2013; all of which are hereby incorporated by reference in their entirety.

The above-mentioned U.S. Ser. No. 16/242,015 is also a Continuation-in-Part (CIP) of U.S. Ser. No. 15/368,608, filed on Dec. 4, 2016, now patent number U.S. Pat. No. 10,949,757 (issued on Mar. 16, 2021), which is hereby incorporated by reference in its entirety.

The above-mentioned U.S. Ser. No. 15/368,608 is a Continuation-in-Part (CIP) of U.S. Ser. No. 15/001,259, filed on Jan. 20, 2016, now patent number U.S. Pat. No. 9,541,995 (issued on Jan. 10, 2017); which is a Continuation of U.S. Ser. No. 14/320,653, filed on Jul. 1, 2014, now patent number U.S. Pat. No. 9,275,337 (issued on Mar. 1, 2016); all of which are hereby incorporated by reference in their entirety.

The above-mentioned U.S. Ser. No. 14/320,653 claims priority and benefit from U.S. 61/843,915, filed on Jul. 9, 2013, which is hereby incorporated by reference in its entirety.

The above-mentioned U.S. Ser. No. 14/320,653 is also a Continuation-in-Part (CIP) of U.S. Ser. No. 13/922,271, filed on Jun. 20, 2013, now U.S. Pat. No. 8,938,787 (issued on Jan. 20, 2015), which is hereby incorporated by reference in its entirety.

The above-mentioned U.S. Ser. No. 14/320,653 is also a Continuation-in-Part (CIP) of U.S. Ser. No. 13/877,676, filed on Apr. 4, 2013, now patent number U.S. Pat. No. 9,069,942 (issued on Jun. 30, 2015); which is a National Stage of PCT International Application number PCT/IL2011/000907, filed on Nov. 29, 2011; which claims priority and benefit from U.S. 61/417,479, filed on Nov. 29, 2010; and all of the above-mentioned patent applications are hereby incorporated by reference in their entirety.

The above-mentioned U.S. Ser. No. 15/368,608 is also a Continuation-in-Part (CIP) of U.S. Ser. No. 14/727,873, filed on Jun. 2, 2015, now patent number U.S. Pat. No. 9,526,006 (issued on Dec. 20, 2016), which is hereby incorporated by reference in its entirety.

The above-mentioned U.S. Ser. No. 15/368,608 is also a Continuation-in-Part (CIP) of U.S. Ser. No. 15/360,291, filed on Nov. 23, 2016, now patent number U.S. Pat. No. 9,747,436 (issued on Aug. 29, 2017); which is a Continuation-in-Part (CIP) of U.S. Ser. No. 14/718,096, filed on May 21, 2015, now patent number U.S. Pat. No. 9,531,701 (issued on Dec. 27, 2016); which is a Continuation-in-Part (CIP) of U.S. Ser. No. 14/675,768, filed on Apr. 1, 2015, now patent number U.S. Pat. No. 9,418,221 (issued on Aug. 16, 2016); which is a Continuation-in-Part of the above-mentioned U.S. Ser. No. 14/566,723, filed on Dec. 11, 2014, now patent number U.S. Pat. No. 9,071,969 (issued on Jun. 30, 2015); all of which are hereby incorporated by reference in their entirety.

FIELD

The present invention is related to electronic devices and computerized systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking website.

SUMMARY

The present invention may include, for example, systems, devices, and methods for detecting a "vishing" attack (or other type of social engineering attack, or fraud), and/or for stopping or preventing or combatting such attack. Some embodiments enable a computerized system to defend itself against such attack(s), and to have new capabilities that enable the computerized system to autonomously stop such attack(s) and/or to autonomously take mitigation operations or reparation operations for such attack(s).

Some embodiments may enable a computerized system to differentiate or distinguish between: (i) a legitimate user (e.g., the real or true owner of an online account) that voluntarily and freely operates under his own free will and without duress, and (ii) the legitimate user that operates under duress and/or that performs computerized operations under the dictated instructions or the dictated guidelines that are conveyed to him by a third party (e.g., a remote third party such as a fraudulent person that poses to be a customer service representative).

Some embodiments may further distinguish among: between: (i) a legitimate user (e.g., the real or true owner of an online account) that voluntarily and freely operates under his own free will and without duress, and (ii) the legitimate user that operates under duress and/or that performs computerized operations under the dictated instructions or the dictated guidelines that are conveyed to him by a third party (e.g., a remote third party such as a fraudulent person ("fraudster") that poses to be a customer service representative), and (iii) an illegitimate user that logs-in or accesses an online account and is not the legitimate user (e.g., is not the true owner or the real owner of that account).

Some embodiments may operate to detect or to confirm identity of a user of an electronic device, and/or for determining whether or not an electronic device is being used by a fraudulent user or by a legitimate user, and/or for differentiating or distinguishing between (or among) users of a computerized service or between (or among) users of an electronic device.

The present invention may provide other and/or additional benefits or advantages.

BRIEF DESCRIPTION OF THE DRAWINGS

FIG. 1 is a schematic block-diagram illustration of a system, in accordance with some demonstrative embodiments of the present invention.

DETAILED DESCRIPTION OF SOME DEMONSTRATIVE EMBODIMENTS

The Applicants have realized that in addition to a "phishing" attack, in which a fraudulent email attempts to lure a user to log-in into a fake website that poses as a legitimate website (and thus operates to steal user credentials), other types of attacks and social engineering schemes may be utilized against users of electronic devices, such as a "vishing" attack as described herein.

The Applicants have realized that some criminals or fraudulent users or "fraudsters" perpetrate fraud by performing social engineering upon victims, particularly via a "vishing" attack in which the victim is persuaded or lured to submit or to perform online financial transactions under false pretenses, particularly based on telephonic guidelines or telephonic instructions that are provided to the victim by the fraudster who poses to be a customer service representative that attempts to help the victim over the telephone.

In a first example, a criminal Carl calls by phone the victim Victor; the criminal Carl poses over the telephone to be a representative of a bank in which the victim Victor has an account. The criminal Carl explains to the victim Victor that the bank account of victim Victor was compromised, and that the bank is now opening a new non-compromised account for victim Victor, and that the representative Carl will now guide the victim Victor how to log-in to his current bank account in order to transfer his funds from it to the newly-opened bank account. Then, the criminal Carl guides the victim Victor to access the real and legitimate website of the bank; to log-in to the victim's real and legitimate bank account, using his real credentials; and then, the criminal Carl guides the victim Victor to do a wire transfer to a destination account, that is said to be the newly-opened non-compromised bank account of the victim Victor, but is in fact a third-party bank account that is controlled by criminal Carl. The victim Victor proceeds to perform these online operations, based on telephonic instructions that are dictated to him over the phone.

The Applicants have realized that this type of attack(s), sometimes referred to as a "vishing" attack, may be very difficult to detect and/or to prevent; since, for example, the online transaction is performed by the legitimate user (the real owner of the bank account), who enters his real and regular credentials (username and password), who utilizes his regular computer and his regular web browser from his regular Internet Protocol (IP) address (such as from his home); and may even perform two-factor authentication (e.g., by clicking on an authentication link that is provided to him by email, or be entering a code that is sent to him via SMS message). Similarly, other security measures that aim to validate the identity of the user, such as security questions that are presented to the user, are ineffective to stop vishing attacks since it is indeed the legitimate user that logs-in and performs the online operations that (unknown to him) carry out the fraudulent transaction that benefits the fraudster based on the guidelines from the fraudster.

The terms "vishing" or "vishing attack" as used herein may comprise, for example, an attack (or a social engineering process which is part of an attack) against a victim, in which the attacker contacts the victim via telephone (e.g., landline, cellular phone, mobile phone, Voice over IP telephony, or the like), the attacker poses to be a representative of an organization (e.g., bank, banking institution, credit card company, lender, financial institution), and the attacker persuades the victim to perform operations on a computing device of the victim (e.g., a computer, a laptop, a smartphone, a tablet) in which the victim is directed by the attacker to log-in or to sign-in into the victim's online account and then the victim is directed by the attacker to perform online operations that yield a benefit to the attacker and/or that cause damage to the victim and/or that cause damage to a third party (e.g., the bank, the credit card issuer, or the like); particularly, for example, operations in which the attacker dictates to the victim instructions or guideline to perform funds transfer from the victim's own account to another account which is actually controlled by the attacker. In some embodiments, the terms "vishing" or "vishing attack" may comprise other types of attacks in which the victim is contacted by a criminal or a fraudster or an attacker that guides or directs or commands the victim to perform certain operations, and/or in which the victim is performing certain operations online under duress or under the dictated commands of an attacker. In some embodiments, the terms "vishing" or "vishing attack" may comprise an attack in which a non-human caller, such as a robot-caller or robo-caller or a computerized machine or automated machine or other "bot" interacts via a telephone call with the victim and/or guides the victim which operations to perform online; as well as an attack performed by a combination of a human attacker and a non-human attack module (e.g., the human attacker calls the victim and narrates an introductory explanation, and then directs the victim to follow the guidelines that an automated machine or message provides over the phone).

Some embodiments of the present invention may detect a vishing attack in real time, or near real time, or substantially simultaneously or concurrently as the vishing attack (or at least a portion thereof) is carried out; for example, by monitoring online operations of the victim in real time or near real time (e.g., several seconds after each operations is performed) and analyzing them (e.g., as described herein) to deduce or to estimate or to determine that a vishing attack is being performed; and to immediately send a notification or indication of such real-time vishing attack to a suitable recipient (e.g., cyber security team or fraud department of the bank). Some embodiments may detect a vishing attack in retrospect, after it occurred, and/or after it was completed, and/or after it was attempted; for example, by inspecting and analyzing logged transactions and/or logged user interactions that were already performed, and by deducing from them that a certain transaction and/or that a certain set of operations were performed by the victim within a vishing attack. Some embodiments may provide autonomous real-time vishing attack detection and protection (e.g., stopping or rejecting an attempted transaction in real time), and/or autonomous retrospective or after-the-fact detection and mitigation (e.g., cancelling or reversing an already-submitted transaction or even an already-performed transaction).

A first set of embodiments of the present invention operates to automatically detect a vishing attack based on Playbook Detection. The Applicants have realized that when a fraudster guides or instructs the victim what to do, the fraudster often follows a pre-defined, fraudulent, "playbook" or step-by-step set of instructions that the fraudster is dictating to the victim over the phone, detailing which online operations to do exactly, and in which order or sequence, and often further dictating to the victim which buttons to click, which fields to fill out, which fields to leave blank, which User Interface (UI) or GUI elements to utilize or to engage (e.g., to operate a drop-down menu, to scroll down or up or sideways), or the like. In accordance with the present invention, a "vishing" playbook may be pre-defined or profiled by the computerized system of the present invention by taking into account multiple parameters, for example: list of actions taken, GUI elements that were selected and/or clicked and/or otherwise engaged, list of input fields that were filled out, the sequence or order of such actions, the time that elapsed between such actions, or the like. Accordingly, the particular sequence or list of operations that a user performs in his online account in a usage session, is compared to or is analyzed in view of various Vishing Playbook Profiles, in order to find a sufficient match or similarity to at least one such Playbook; a similarity score, indicating how similar the user's operations are, relative to a particular Vishing Playbook Profile, may be generated by the system and utilized as a risk score or risk indicator; such that the greater the similarity between the operations that the user performed and the pre-defined playbook profile of a vishing attack, the more likely is it that the set of operations that the user performed were indeed performed due to a dictating fraudster and not in a voluntary free manner.

A second set of embodiments of the present invention operates to automatically detect a vishing attack, based on detecting that the user of an online service is operating the service under duress and/or under dictated instructions that are dictated to him. The Applicants have realized that a legitimate user that is not subject to a vishing attack, performs operations in an online service in a manner that is different from a vishing attack victim, who operates under the duress of dictated instructions and also has to hold a telephone and speak on the telephone in parallel to operating the online service; and that a user who is not a victim of a vishing attack is free to perform online operations without the need to speak on the phone at the same time and without the duress of being instructed what to do online. Accordingly, the present invention may detect a vishing attack based on the impact or the effect that such attack has, as reflected in user operations. For example, a rhythm of typing, and/or a rhythm of typographical errors, may be indicative that the user is being instructed what to type (and is thus a victim of a vishing attack); or conversely, may indicate that the user is more-probably operating freely and voluntarily without being dictated what to do or what to type. Additionally or alternatively, for example, a user that is not subject to a vishing attack exhibits focused and concise online operations, that do not waste his time and/or that reflect his intention to achieve a desired goal efficiently and without distraction; whereas in converse, a user that is a victim of a vishing attack may often spend time waiting and listening to instructions that are dictated to him over the phone and during that "waiting time" may often move the on-screen pointer (e.g., mouse pointer, touchpad pointer) aimlessly or in accordance with a pattern (e.g., moving the mouse-pointer back-and-forth or left-and-right or in circular movements) or performing "doodle" movements or un-purposefulness movements of the on-screen pointer while he waits or while he listens to the attacker's instructions. Monitoring and analyzing the user interactions may thus reveal whether it is more likely that the user acted under duress (e.g., within a vishing attack), or whether it is more likely that the user acted without duress and according to his own free will. The user interactions, that were performed within a certain user transaction or usage session (e.g., a wire transfer session), may thus be analyzed and/or compared to such criteria, in order to generate a risk score or a probability score that indicates how close the logged interactions are to a behavioral profile of a victim that operates under duress or to a victim that operates in a vishing attack unknown to himself.

A third set of embodiments of the present invention operates to automatically detect a vishing attack, based on detecting or estimating that the user of an online service is operating the service while the user is also speaking on the telephone, and/or while the user has an on-the-phone posture or position, and/or while the user is holding a telephone to his ear concurrently to performing online operations. The Applicants have realized that a victim of a vishing attack, who needs to hold and operate a telephone (e.g., to receive the telephonic instructions of the attacker) in parallel to operating a computer (or computing device) to perform such instructions, exhibits behavioral characteristics that are different from those of a non-victim user who is not subject to a vishing attack. The fact that the user holds a telephone and also listens and talks through the telephone, while the user also operates the computer or the computing device, impacts or affects the posture and/or the user's behavior and/or the user's interactions with the computer (or computing device, or the "app" or website). Experiments performed by the Applicants have shown that a user that performs operations in an online service without holding and utilizing the phone, and the same user that performs operations in the same online service while also holding and utilizing the phone, exhibit different behavioral characteristics with regard to, for example, typing speed, typing rhythm, typographical errors frequency, typographical errors rhythm, mouse movement (or other on-screen pointer movement), and/or other characteristics that may be sensed by a sensor and/or accelerometer and/or gyroscope and/or compass and/or device orientation sensor of the user's device. The user interactions, that were performed within a certain user transaction or usage session (e.g., a wire transfer session), may thus be analyzed and/or compared based on such criteria, in order to generate a risk score or a probability score that indicates how close the logged interactions are to a behavioral profile of a victim that performs these interactions in parallel to also holding a telephone and/or speaking on the phone and/or listening on the phone.

Reference is made to FIG. 1, which is a schematic block-diagram illustration of a system 100, in accordance with some demonstrative embodiments of the present invention. For example, a device 101 (e.g., laptop computer, desktop computer, tablet, smartphone) is utilized by a victim user 199 in order to access and to perform online operations in a computerized service 103 (e.g., a banking website, an online banking system, or the like), for example over the Internet or over wireless communication link(s) and/or wired communication link(s). The victim user 199 is also holding or utilizing, concurrently, a phone 104, through which he receives instructions or commands that are dictated to him by a remote attacker 198 who utilizes his own phone 106 to convey such instructions to the victim user 199.

For example, device 101 may comprise: a processor 110 to execute code; a memory unit 111 to store data (e.g., Flash memory); a storage unit 112 to store data long-term (e.g., Flash memory; hard disk drive; solid state drive); a display unit 113 (e.g., screen, monitor, touch-screen); other output unit(s) 114 (e.g., headphones, audio speakers); one or more input units 115 (such as, mouse, touch-screen, microphone); a wireless transceiver 116 (e.g., Wi-Fi transceiver, Bluetooth transceiver, cellular transceiver); optionally, one or more accelerometers 117, one or more gyroscopes 118 (or other device-orientation sensors), one or more compass units 119; an Operating System (OS) 120; one or more applications 121 or "apps" (e.g., a mobile application, a native application, a mobile-friendly application, a desktop application, a browser-based application); and/or other suitable hardware components and/or software components.

Computerized service 103 may comprise, or may be implemented by using, for example, a web server 103A, an application server 103B, a database 103C, and/or other suitable components. For example, computerized service 103 may be an online banking service, which may comprise or may utilize a web server to serve pages of the website of the banking entity to its customers, and/or an application server to run server-side applications and/or to perform server-side operations (e.g., to perform the banking operations that carry out a "funds transfer" command), and/or a database that stores banking records of customers, or the like.

The system 100 monitors and logs the interactions of the victim user 199 with the computerized service 103, and particularly monitors and logs: (i) the transactions performed by the victim user 199 (e.g., wire transfer; balance inquiry), and (ii) the online operations performed by the victim user 199 and his engagement with UI elements or GUI elements (e.g., the victim user 199 clicks on a "confirm" on-screen button; the victim user 199 engages with a drop-down menu GUI element to select a bank account), and (iii) the actual interactions that the victim user 199 performs via one or more of the input units.

For example, a Transactions Monitoring/Logging Module 121 monitors and logs which transactions are performed or commanded or submitted or initiated by the victim user; for example, logging that at time point T3 the victim user submitted a "wire funds" transaction. An Online Operations Monitoring/Logging Module 122 monitors and logs which operations were performed by the victim user; for example, that at time point T2 (e.g., five seconds before time point T1) the victim user engaged with the on-screen drop-down menu of selecting the source account for the funds to be transferred out. An Input Units Monitoring/Logging Module 123 monitor and logs that at time point T1 (e.g., three seconds before time point T2), the victim user performed a drag-and-drop operation of his computer mouse for one second in order to reach the drop-down menu and then the victim user left-clicked on that drop-down menu via his mouse and then he chose an item from the drop-down menu using the Arrow Keys on his keyboard and the Tab key on his keyboard.

It is noted that in some embodiments, modules 121 and/or 122 and/or 123 may be part of computerized service 103 (e.g., implemented as server-side units), and/or may be part of device 101 (e.g., implemented as client-side units), and/or may be a combination of modules which may be implemented as server-side module(s) and/or client-side module (s). For example, in some embodiments, the Transactions monitoring and logging may be performed at the server-side of computerized service 103, which receives the submitted commands to perform transactions and is supposed to execute them; and/or the transactions monitoring and logging may be performed at the client side in the device 100 which sends out the commands to perform such transactions. For example, the monitoring of Input Units interactions may be implemented as a client-side module, e.g., as part of the application or "app" (e.g., a banking application, or banking website) which locally monitors and logs all keystrokes and mouse-gestures and touchpad gestures; and/or may be implemented as client-side browser extension or plug-in or add-on, or as JavaScript/HTML5/CSS code portions. In some embodiments, the engagement of the user with various UI or GUI elements, may be monitored and logged in a client-side manner (e.g., logged locally upon a local click of the user on a GUI element) and/or in a server-side manner (e.g., logged at the server of the computerized service 103 which receives a signal that indicates that a certain GUI element was clicked, or was engaged). In some embodiments, data that was monitored and/or logged locally in (or at, or by) device 101, may be sent and/or uploaded from device 101 to the server of computerized service 103, or to a security module associated therewith, for further processing and/or server-side analysis. In some embodiments, data that was monitored and/or logged in (or at, or by) the computerized service 103 and/or its server, may be sent and/or transmitted from it to the device 101 for further local (client-side) analysis, and/or may be sent for another security module associated therewith.

The attacker 198 that dictates instructions to the victim user 199 over the phone, may follow a pre-defined Vishing Attack Playbook 197 that the attacker had prepared in advance and that he follows step-by-step. The Vishing Attack Playbook 197 comprises step-by-step instructions that are then converted at the victim's side to step-by-step operations, such as: (I) log-in to your (the victim's) account at MyBank.com; (II) click on "balance inquiry" on the left side; (III) click on "transfer funds" on the right side; (IV) select "immediate transfer" from the drop-down menu that contains the options of "immediate transfer" and "future transfer"; and so forth.

The system may comprise a Vishing Attack Playbook Database 151, which may store representations of one or more such Playbooks that are known or that are estimated, based on research performed by fraud prevention department or cyber security researchers. For example, based on retrospective analysis of several already-occurred vishing attacks at MyBank.com, the fraud department of that bank may observe a repeated pattern of monitored and logged Transactions and/or monitored and logged online operations and/or monitored and logged GUI engagement operations; and may be able to extract or to deduce a general Playbook that serves an attacker (or multiple attackers) that command that type of vishing attacks.

It is noted that the Vishing Attack Playbook 197 that is utilized by the attacker, may be for example a textual narrative of step-by-step instructions; whereas, each record in the Vishing Attack Playbook Database 151 may store digital representations of such instructions (or, of the online operations that are derived from them). For example, the Vishing Attack Playbook 197 that is utilized by the attacker may comprise a textual item of "Please click on Balance Inquiry on the left side"; whereas, a corresponding entry in the Playbook that is stored in the Vishing Attack Playbook Database 151 may represent "User (victim) clicked on (or otherwise selected) the Balance Inquiry hyperlink in the Account Summary web-page".

A Vishing Playbook Matching Module 152 operates to search for, and to find, a match or a similarity between: (I) a transaction performed by the victim user and/or the online operations that yielded that transaction and/or the GUI engagement operations of those online operations; and (II) a representation of a Vishing Attack Playbook out of one or more such Playbooks that are stored in the Vishing Attack Playbook Database 151.

If the Vishing Playbook Matching Module 152 finds a match (e.g., an exact match), or a sufficiently-similar match (e.g., at least N percent of the victim's operations in this transactions have followed the operations in the Vishing Attack Playbook that is stored in database 151; wherein N may be 80 or 90 or other suitable threshold value), then a Playbook-Based Vishing Attack Detector 155 generates an indication or a message that a playbook-based detection of vishing has occurred; and a Fraud Mitigation Module 156 may perform one or more pre-defined mitigation operations (e.g., put a Hold on the associated transaction; add a Fraud Flag to the associated transaction; send a message to the fraud department; send a message to the victim user; lock the account until the victim authenticates to a customer service representative; or the like).

For demonstrative purposes, the Vishing Attack Playbook Database 151, the Vishing Playbook Matching Module 152, and the Playbook-Based Vishing Attack Detector 155 are depicted as server-side units of computerized service 103; however, one or some or all of them may be implemented as client-side modules in device 101; or they may be implemented as a combination of server-side and client-side modules.

One or more of the operations that are described above or herein, may be performed or implemented by a Vishing Attack Detector 177; which may be implemented as a server-side unit or module, or as a client-side (end-user device side) unit or module, or as a combination of server-side and client-side modules or units. For demonstrative purposes, Vishing Attack Detector 177 is depicted as a separate module; however, it may be implemented as a unit or module that comprises multiple other units or modules that are depicted, and/or may be implemented as part of (or in combination with) other module(s) or unit(s) depicted. For example, the playbook-based vishing attack detector 155, may be implemented as part of a more-general Vishing Attack Detector 177 able to detect vishing attack(s) based on playbook identification and/or based on other methods as described above and herein.

In some embodiments, computerized service 103 may comprise a real-time scanner 153 and/or a historic operations scanner 154, which may be configured to operate in conjunction with (or as part of; or as associated with) the Playbook-Based Vishing Attack Detector 155. For example, historic operations scanner 154 may scan and analyze a batch or a set of past transaction(s) and/or operation(s) of a particular user, or of a group of users, in order to identify that a set of such transactions and/or operations matches (e.g., sufficiently, beyond a pre-defined threshold value of similarity) at least one pre-defined Vishing Attack Playbook that had been profiled and defined in the Vishing Attack Playbook Database 152; and the historic operations scanner 154 may automatically detect and notify the administrator of computerized service 103 about such possibly-fraudulent past transactions that appear to be vishing related. The real-time scanner 153 may operate in real time or in near real time, to analyze a newly-submitted transaction (e.g., a newly-submitted transaction of "wire funds") and to detect whether it matches a previously-defined Vishing Attack Playbook; and/or may analyze in real time a newly-performed UI or GUI engagement operation or an online operation, to check whether it fits into one or more of the Vishing Attack Playbooks that are stored in database 151, and to autonomously generate real-time or near-real-time alerts or possible-fraud notifications about such transactions and/or operations immediately as they occur or immediately as they are submitted for server-side fulfillment (e.g., and prior to actual server-side fulfillment of such requested transactions).

In some embodiments, a Duress Detector/Estimator 157 may operate to detect, or to estimate, that a particular transaction or that a set of operations were more-probably or most-probably performed by the user under duress, or under illegitimate influence or fraudulent influence of a third party, or while the user was obeying or following dictated instructions that were dictated to him by a third party.

For example, analysis of the user interactions that are associated with a submitted transactions, by a Doodling Detector 158, may indicate that a user performed "doodling" operations (e.g., repetitive movement of the on-screen pointer, typically according to a particular pattern or a shape, or back and forth, or in circular motion, or in polygon shape) during one or more time-periods of inactivity within a set of operations that yielded that transactions; and such detection of a doodling period or doodling time-slot or doodling activity, particularly within an important banking transactions such as a wire transfer, may trigger an estimation or determination that the user was operating under duress or under dictated instructions of a vishing attacker. Optionally, the detection of doodling activity may be indicative of a vishing attack, only if all or most or some of the prior transactions of that particular user, of the same type of transactions (e.g., prior wire transfers by that user), did not exhibit doodling activity at all; or exhibited doodling activity that is smaller than the current doodling activity by at least N percent of by other threshold value (e.g., the currently-analyzed doodling activity spanned 27 seconds during the transaction submission process, whereas prior transactions exhibited doodling activity for only 2 or 3 seconds per transaction submission process).

For example, analysis of the user interactions that are associated with a submitted transactions, by a Doodling Detector 158, may indicate that a user performed "doodling" operations (e.g., repetitive movement of the on-screen pointer, typically according to a particular pattern or a shape, or back and forth, or in circular motion, or in polygon shape) during one or more time-periods of inactivity within a set of operations that yielded that transactions; and such detection of a doodling period or doodling time-slot or doodling activity, particularly within an important banking transactions such as a wire transfer, may trigger an estimation or determination that the user was operating under duress or under dictated instructions of a vishing attacker. Optionally, the detection of doodling activity may be indicative of a vishing attack, only if all or most or some of the prior transactions of that particular user, of the same type of transactions (e.g., prior wire transfers by that user), did not exhibit doodling activity at all; or exhibited doodling activity that is smaller than the current doodling activity by at least N percent of by other threshold value (e.g., the currently-analyzed doodling activity spanned 27 seconds during the transaction submission process, whereas prior transactions exhibited doodling activity for only 2 or 3 seconds per transaction submission process).

Additionally or alternatively a "dead time" detector or an "idle time" (or "waiting time" or "down time") detector may be included in the system; for example, to detect, measure and/or characterize, and then utilize or compare, "dead time" or "idle time" among or between user interactions or user gestures or GUI element engagement events. During such dead-time or idle-time, nothing occurs, and no input is sensed or detected via any input unit of the electronic device; not even aimless movement or purposeless doodling. In some embodiments, optionally, idle time gaps (e.g., between two such events or gestures or user-interactions) that are smaller than a pre-defined threshold value (e.g., smaller than 3 seconds, or smaller than 5 seconds, or smaller than N seconds) may be discarded or ignored. The Applicants have realized that during a vishing attack, the victim exhibits a greater number of such dead-time or idle-time events or gaps, and/or exhibits a greater average length (or maximum length, or minimum length, or median length, or the like) of such idle-time or dead-time periods, relative to a user that operates on her own accord and not under the instructions of a vishing attacker. Even though idle-time or dead-time events are detected to some extent in regular non-attacked usage, they are more frequent and/or more numerous and/or longer in a vishing attack, as the vishing victim spends idle time while he is listening to the vishing attacker and without performing any gestures or without interacting with the electronic device via any input unit. Accordingly, sensing and measuring the average idle-time events, their frequency, and/or their number in a usage session (or, in a particular portion of a usage session; such as, only during the engagement of the user with the "perform a wire transfer" page of a banking website), while comparing these parameters to previously-sensed parameters of that same user in previous usage sessions, and/or by comparing these parameters to pre-defined threshold values or ranges-of-values, may lead to a determination or an estimation that a vishing attack is detected.

Additionally or alternatively, in any implementation in which "typographical errors" are tracked or monitored or measured or analyzed as a characteristic that indicates vishing, the system may further monitor, track, measure, analyze and/or utilize (additionally, or alternatively) the manner or way or pattern of correcting such typographical errors; since the Applicants have realized that users correct typographical errors differently in vishing attack compared to in a non-vishing (non-attacked) situation. For example, in a vishing attack, the victim may pause for a few seconds, reading back to the attacker what the victim had has typed in, and then the victim may hit a single "backspace" to correct the last letter or digit that he typed; whereas, a non-vishing correction of typographical error often happens faster (e.g., without a delay for reading aloud to the attacker the data as typed) and/or involves the correction of more letters or digits or characters (e.g., one by one, or as a "burst" or "stretch" of multiple corrections performed consecutively). Accordingly, the system may comprise a Correctio Pattern Detector unit or module, to detect and characterize such correction patterns; to compare them to previous correction patterns as exhibited in the past by the same user; to compare them to pre-defined threshold values or ranges; and to determine, based on them, that a vishing attack is suspected to exist.

Additionally or alternatively, a User-Hesitation Detector, or a detector of input-unit interactions that indicate existence of user hesitation, may be included in the system and utilized for determining or estimating a vishing attack. Such detector may identify user hesitation, for example, exhibited by the user moving the on-screen-cursor more slowly (e.g., than before; or, than a pre-defined threshold value) in order to click a button and/or to engage with a GUI element and/or to take an action, particularly when compared with the user's behavior in general or in past usage sessions, or relative to the average values in the population, or relative to a pre-defined threshold value or range-of-values. The Applicants have realized that a vishing victim often hesitates and exhibits a greater number of events (or indicators) of user hesitation and/or longer periods of user-hesitation as the criminal guides him through the session; and tracking and monitoring these events may be utilized for determining a vishing attack.

Additionally or alternatively, a Typing Rhythm Analyzer 159 may analyze the user interactions and may characterize their rhythm; such as, not only the typing speed (e.g., characters per second), but rather, the internal patterns of typing and pausing; and such rhythm may be utilized to determine or to estimate that a vishing attack was performed. For example, a non-attacked user that types data into fields of a banking application or a banking website, to perform a wire transfer, may operate in a concise and focused manner that exhibits a generally fixed rhythm of entering data; such as, the non-attacked user enters the beneficiary name by rapid typing, then pauses for two seconds and enters the beneficiary address by rapid typing, then pauses for five seconds and enters the beneficiary account number, and so forth. In contrast, a victim of a vishing attack exhibits a different, unique, pattern or rhythm of typing and pausing; for example, starting the "wire transfer" data entry by a pause of non-activity (e.g., no data is typed or entered) while the vishing victim listens to the attacker for 15 seconds; then, typing in a first field at a relatively slower speed or pace (e.g., slower than previously-recorded pace or speed of that user), and in a manner or rhythm that indicates hesitation (e.g., typographical error(s) in simple fields that are supposed to be familiar to the user; slow typing of data that is supposed to be familiar to the user); then, another long pause of 12 seconds as the vishing victim listens to further instructions of the attacker then, slow entry and/or hesitant entry and/or error-infested entry of data into the next field; and so forth. The Typing Rhythm Analyzer 159 may thus autonomously detect or estimate, that an observed rhythm of typing or of typographical errors, is more similar to rhythms that are pre-defined as rhythms that are typically sensed in a vishing attack, relative to rhythms that characterize data entry by a non-attacked user.

Additionally or alternatively, system 100 may comprise or may utilize a unit or module which operates to detect or determine that the user of device 101 is operating the device 101 while also holding a phone; as this may be indicative of, or may base a determination of, a vishing attack being carried out against such user. For example, a Phone Holding Detector 160 may be part of device 101 and/or of computerized service 103, and may reach such determination based on one or more of the following sensed parameters, or by taking into account one or more, or some, or all of the following parameters: (1) detecting that the typing rhythm of the user on device 101, is similar (by at least a pre-defined threshold value of similarity) to a pre-defined typing rhythm that characterizes users that hold a phone to their ear while also operating a non-phone computing device such as device 101; for example, exhibiting pauses and non-typing periods and no-data-entry periods in which the user is listening to the phone, and/or exhibiting a pattern that indicates that the user is typing or entering data (or engaging with UI or GUI elements) only with one hand (e.g., since his other hand is holding the phone to his ear); (2) detecting that the typing rhythm of the user on device 101, is different (by at least a pre-defined threshold value of difference) from previous or past or historic or most-recent rhythm or rhythms that were monitored in the past for this particular user (e.g., in general, or in this particular type of transactions, such as in previous "fund transfer" transactions data entry); for example, in previous data entry session(s) of the same user in the same type of transactions, the user had a generally-fixed rhythm of typing or data entry and did not exhibit long (e.g., longer than N seconds, or other threshold value) periods of inactivity; whereas in the current or in the investigated usage session, the user exhibits one or more periods of inactivity or a "broken" or "interrupted" data entry process due to partial inability to type with two hands or due to the ability to type or to engage with UI or GUI elements with only one hand, or due to having a particular bodily posture (e.g., holding the phone to his ear via a raised shoulder) that causes the user to exhibit a different typing rhythm or data entry rhythm compared to previously-observed or historic or past data-entry rhythm of that user in this type of transactions; (3) similarly to parameter (1) above, detecting a current rhythm of introducing typographical errors, which is sufficiently similar to a pre-defined rhythm of introducing typographical errors that characterizes users that hold a phone to their ear; (4) similarly to parameter (2) above, detecting a current rhythm of introducing typographical errors, which is sufficiently different than (e.g., sufficiently greater than or more frequent than or more erroneous than) historic or past or previous or most-recent rhythm of introducing typographical errors of that same user and optionally for example in this type of transactions (e.g., the current rhythm of introducing typographical errors in a current usage of a wire-transfer page, as compared and as being different from previous or past characteristics of usage by the same user in previous or past utilizations of that wire-transfer page); (5) determining that a pattern or a characterizing feature of multiple on-screen pointer movements, that are a result of mouse gestures or touch-pad gestures or other input-unit gestures, is sufficiently similar to a pattern or to a characterizing feature that is pre-defined as such that characterizes a user that operates a non-phone device 101 while also holding a phone to his ear; (6) determining that a pattern or a characterizing feature of multiple on-screen pointer movements, that are a result of mouse gestures or touch-pad gestures or other input-unit gestures, is sufficiently different from previous or historic or past or most-recent pattern(s) or characterizing feature(s) of the same user, in general and/or particularly in similar past transactions that he performed or in the same type of transactions (e.g., comparing a pattern or a characterizing feature of multiple on-screen pointer movements in a current usage-session specifically in a wire-transfer page, to previous such patterns or characteristics in previous utilization of that particular wire-transfer page by the same user); (7) utilizing one or more data that is sensed or measured by accelerometer(s) and/or gyroscope(s) and/or compass unit(s) and/or device-orientation sensor(s) of device 101, to determine that the user is tilting or rotating or moving the device 101 (e.g., which may be a tablet that the user holds in two hands, while the user also holds a phone to his ear via his raised shoulder) in a manner or in a pattern or with behavioral characteristic or with spatial characteristics (e.g., device 101 orientation and changes therein; device spatial location and changes therein; device acceleration or deceleration and changes therein) that are sufficiently similar (e.g., beyond a pre-defined level of similarity) to a manner or a pattern or to a behavioral characteristic or to spatial characteristics that characterize a device that is being operated by a user while such user is also holding a phone to his ear; (8) similarly to parameter (7) above, determining that such sensed or measured data, is sufficiently different from the previously-observed or previously-sensed data that was sensed by the same type of sensors in one or more past or previous or historic or most recent usage sessions of the same user, optionally when he performed the same type of transaction on the same website or application. The above-mentioned conditions, criteria and/or parameters (or a selected subset of them) may be utilized in combination, and may be implemented, measured, detected, compared and/or analyzed via one or more suitable units or modules, for example, performed by a Data Entry Rhythm Detector 161, by a Typographical Errors Rhythm Detector 162, by a Spatial Characteristics Detector 163, and/or by other suitable units or modules.

In some embodiments, optionally, system 100 may comprise or may utilize a unit or module, such as an Alternating Smartphone Usage Detector 165, to detect or to estimate that a particular scenario is taking place or took place, in which the user is alternately utilizing one smartphone for both (I) receiving audio instructions from a third-party vishing attacker, and (II) accessing the computerized service (e.g., banking application, banking website) to perform such audio instructions via the touch-screen of that same smartphone. For example, the Alternating Smartphone Usage Detector 165 may utilize data sensed by the accelerometer(s) and/or gyroscope(s) and/or compass unit(s) and/or device-orientation sensor(s) of device 101, to detect an alternating pattern of spatial locations or characteristics; such as, detecting that the smartphone was put to the ear (e.g., a generally vertical orientation of the smartphone) for ten seconds (the user listens to audio instructions and is not engaging with the touch-screen of the smartphone), then detecting that the smartphone is generally horizontal and that the touch-screen of the smartphone is being engaged by the user (e.g., the user is not listening to audio instructions, and is entering data on the same smartphone), then repeating such alternate pattern of (I) smartphone being utilized for hearing audio instructions and/or for talking and/or being generally vertical in its orientation, and (II) smartphone is not being utilized for hearing audio instructions and/or is not being utilized for talking and/or is being in generally-horizontal orientation and/or is being utilized to enter data or to engage with UI or GUI elements via its touch-screen, and then repeating such alternating usage pattern, which is indicative of a vishing attack taking place in the background.

In some embodiments, optionally, system 100 capture audio sample(s) via a microphone of device 101, and may analyze them locally in device 101 and/or remotely in a remote server of computerized service, to perform speech-to-text conversion of such captured audio; and to detect one or more pre-defined keywords or natural language word(s) or term(s) that match a pre-defined list of keywords or terms that indicate that a third party is dictating to the user to perform online operations. For example, a local or remote Audio Sample Analyzer 166 may perform such speech-to-text conversion to extract words or phrases or terms from captured audio samples, and a Natural Language Processing (NLP) Analyzer 167 may analyze the extracted text or words or phrases or terms, optionally in relation to a pre-defined Lookup Table 168 or list or database of words or terms that characterize (or that are typically found in) a vishing attack; for example, detecting audio samples which comprise instructions such as "please click on the Beneficiary field on the left side" or such as "now, please select Wire Funds Now on the top-right corner of your screen", and deducing that the operations are most-probably or more-probably associated with a vishing attack that is performed on the user of device 101 without his knowledge.

Some embodiments may utilize or may take into account, additionally or alternatively, an analysis of the Average Typing Speed of the user as a parameter for determining whether it is estimated that the user is operating within a vishing attack. In some embodiments, for example, the average typing speed (or the average data-entry speed) of a user may be lower than a pre-defined threshold, since he needs to follow vishing instructions (which introduce a delay, rather than typing spontaneously), and/or since the user is typing (or operating his electronic device) with only one hand while holding the phone in the other hand; and this may therefore be an indicator of a vishing attack. Alternatively, in other embodiments, average typing speed (or average data-entry speed) of the victim user may be faster or greater than a threshold value, since the user was interrupted from his regular activities due to the vishing attack phone call which is a nuisance to the user who is anxious to complete the required task and return to her regular activities. In some embodiments, the threshold value may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

For demonstrative purposes, the Average typing speed is utilized above, or the Average value of a particular characteristic is measured and then utilized; however, some embodiments may similarly utilize the maximum or minimal value, or the minimum or minimal value, or the mean or median value, or the variance or the standard deviation value(s), or the mod or most-frequent value, or other suitable values of a particular sensed or measured or tracked or monitored characteristics, instead of (or in addition to)

utilizing the Average value. This approach may similarly apply to any other parameter or characteristic that is described above or herein.

It is noted that the fact that there may be two alternative effects for a vishing attack on the above-mentioned parameter, does not negate the utility of that parameter, and still enables to construct an efficient and effective system and method for detecting a vishing attack, which would be tailored to a particular online system based on the usage characteristics of that system. For example, FirstBank may perform an analysis of K usage sessions (e.g., 20 usage sessions) that are known to be, in retrospect, usage sessions performed by victims of vishing attacks; and may determine that due to the particular on-screen interface characteristics of FirstBank, all (or most, or 90 percent of) victims of vishing attacks in the platform of FirstBank have exhibited a slower or reduced Average Typing Speed during vishing attacks. Accordingly, the vishing detection method that FirstBank would use, may be configured such that a decrease (and not an increase) in the average typing speed is an indicator for a possible vishing attack. In contrast, SecondBank may have a different web site or platform or interface, and may perform its own analysis of N (e.g., 25) usage sessions that are known to be vishing attacks; and may find that in its unique platform, due to the particular on-screen interface characteristics of SecondBank, all (or most, or 80 percent of) victims of vishing attacks in the platform of SecondBank have exhibited a faster or greater Average Typing Speed during vishing attacks. Accordingly, the vishing detection method that SecondBank would use, may be configured such that an increase (and not a decrease) in the average typing speed is an indicator for a possible vishing attack. A similar approach may be applied to any other parameter that is described above or herein as a parameter that may indicate in some embodiments a vishing attack and in other embodiments a lack of vishing attack; the selection or the configuration which condition to utilize, may be performed based on an initial survey or initial analysis of a set of usage sessions that are known to be vishing attack in that particular platform or website or application or interface; and according to such initial survey or analysis, the method utilizes the particular condition that was found relevant to its particular platform. Accordingly, the legitimacy of utilization of indicators that can be construed in different or even in opposite ways, by different banks or retailers or online destinations or online venues or in different systems or platforms, may be based on one or more considerations; for example, that behavior of the same user, or of different users, may change in accordance with the different platforms or GUI interfaces presented to him, or due to utilization of a particular device; and/or since, for example, even on the same interface and/or the same type of device (e.g., laptop), different users may respond differently to the same interface presented to them, some users typing slower because they are holding the phone or are hesitant, whereas other users are typing faster because their eagerness to complete the task outweighs the factors that might slow them down. Therefore, a particular parameter, and the particular checking of its value against a particular threshold value or a threshold range-of-values, may be tailored by the system to a particular bank or retailer or UI or GUI or application, or to a particular online venue or destination or website, or to a particular page or transaction or transaction-page (e.g., to a wire-transfer page in a banking website), or to a particular user, or to a particular group or subset of users (e.g., only users that utilize the Spanish language version of the banking website and not the English language version of that banking website, or vice versa).

Some embodiments may utilize or may take into account, additionally or alternatively, an analysis of the Average Click (or Tap) Speed of the user as a parameter for determining whether it is estimated that the user is operating within a vishing attack. In some embodiments, for example, the Average Click Speed of a vishing victim is slower, or lower than a pre-defined threshold, or slower than his own previous sessions average click speed, since the victim user is unsure of the instructions that he receives over the phone or is hesitant to transact a large sum of money based on phone instructions. Alternatively, in other embodiments, it may be faster or greater than a threshold value, since the victim user is anxious to complete the task and get back to his regular activities. In some embodiments, the threshold value may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

Some embodiments may utilize or may take into account, additionally or alternatively, an analysis of the Usage-Session Length (e.g., time-length in seconds or minutes; or length as measured by the number of discrete operations and/or clicks and/or taps), as a parameter for determining whether it is estimated that the user is operating within a vishing attack. In some embodiments, for example, a vishing victim may exhibit a longer session length relative to a threshold value, since the user is receiving instructions from a remote attacker and the user is more likely to make errors and correct them, or to pause his activity in order to ask questions towards the attacker. In other embodiments, a vishing victim may exhibit a shorter session length, as he may attempt to merely get rid of the "nuisance" task that interrupted him within his activities, and/or since he does not need to search for data-items but rather they are dictated to him. In some embodiments, the threshold value may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

Some embodiments may utilize or may take into account, additionally or alternatively, an analysis of the inactivity period(s) of the user as a parameter for determining whether it is estimated that the user is operating within a vishing attack. In some embodiments, for example, a victim of a vishing attack may exhibit greater or longer inactivity period (s) during his usage session, and/or a longer cumulative inactivity period during his usage session, compared to his previous usage sessions or his average inactivity during his previous usage sessions or compared to a threshold value; for example, since the vishing victim is often inactive while she listens to instructions of the vishing attacker, and/or while she is asking questions towards the vishing attacker. In some embodiments, the threshold value may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

Some embodiments may utilize or may take into account, additionally or alternatively, an analysis of the Frequency of Mouse Turns (or of the on-screen cursor turns) of the user as a parameter for determining whether it is estimated that the user is operating within a vishing attack. In some embodiments, for example, a victim of a vishing attack may exhibit a greater number of mouse-turns or on-screen pointer turns, due to her uncertainty of the next step until the vishing attacker advises her what to do, and/or while she is navigating the page; and this may be compared to previous sessions of that user, and/or to a threshold value. In some embodiments, the threshold value may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

Some embodiments may utilize or may take into account, additionally or alternatively, an analysis of the Average Distance Between Clicks (or Taps; such as, taps of the user on a touch-pad of a laptop computer) of the user, during a usage session, as a parameter for determining whether it is estimated that the user is operating within a vishing attack. In some embodiments, for example, such distance is greater in a usage session of a victim of a vishing attack; as the user moves with the on-screen cursor with less purposefulness, and therefore exhibits more turns and curvature which increase the on-screen distance traveled, as the user is listening to instructions; relative to a usage session in which the user is acting on their own accord. The average distance between clicks (or taps), and/or the cumulative on-screen distance traveled in a usage session, may be compared to a threshold value. In some embodiments, the threshold value may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

Some embodiments may utilize or may take into account, additionally or alternatively, an analysis of the Average Time Between On-Screen Taps that the user performs directly on a touch-screen, during a usage session, as a parameter for determining whether it is estimated that the user is operating within a vishing attack. In some embodiments, for example, such time or time-gap or time-period may be greater in a usage session of a victim of a vishing attack, as the victim user operates with less purposefulness, and therefore exhibits lengthy delays or time-gaps between taps while the victim user is listening to instructions; relative to a usage session in which the user is acting on their own accord and the time gap between on-screen taps is shorter. The average time gap among on-screen taps, in a usage session, may be compared to a threshold value. In some embodiments, the threshold value may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

Some embodiments may utilize or may take into account, additionally or alternatively, an analysis of the Average Speed of Mouse Movement (or on-screen pointer movement) of the user as a parameter for determining whether it is estimated that the user is operating within a vishing attack. In some embodiments, for example, a vishing victim may move the mouse (or the on-screen pointer) slower, since user is unsure of how to proceed or is hesitant to proceed. Alternatively, in other embodiments, the victim user may act faster if he is anxious to complete the task and get back to his normal activities. In some embodiments, comparison may be done relative to a threshold value which may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

Some embodiments may utilize or may take into account, additionally or alternatively, an analysis of the Mouse (or the on-screen pointer) Displacement-to-Distance Ratio of the user, as a parameter for determining whether it is estimated that the user is operating within a vishing attack. In some embodiments, for example, distance indicates a total distance traveled from the starting point to the ending point; whereas displacement is the length of a straight line that connects the starting point with the ending point. For example, a user that moved the on-screen cursor from point A to point B and then back to point A, may exhibit an on-screen travel distance of 300 pixels, but a displacement of zero pixels since he ended where he started. The smaller the Displacement-to-Distance Ratio, the more indicative this ratio is that the user is performing an aimless doodling activity or aimless moving of the on-screen pointer, such as, since the user is a victim of a vishing attack that listens to instructions and/or waits for further instructions, rather than acting on her own accord. An increased doodling activity, or a reduced or lower Displacement-to-Distance Ratio, may indicate that the usage session was performed in a vishing attack. These parameters may be tracked and compared to a threshold; for example, in some embodiments, the threshold value may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

Some embodiments may utilize or may take into account, additionally or alternatively, an analysis of the Accelerometer Sensed-Data Statistics, of a usage session of the user, as a parameter for determining whether it is estimated that the user is operating within a vishing attack. In some embodiments, for example, when the user utilizes a smartphone to access an online account via its touch-screen, the monitoring may detect abnormal or irregular or increased angular acceleration metrics as the user moves the phone from her ear (while listening to instructions) to being in front of her face (to enact instructions on the touch-screen of the smartphone) and then back to her ear again, and so forth. Alternatively, even if the phone is put on speaker, the user may hold and move phone at different angles than they normally would. These parameters may be monitored and compared to a threshold value, which may be pre-defined or hard-coded; or may be determined based on an average of usage sessions of a population of users or a group of sessions that are known to be (or that are estimated to be) genuine non-vishing sessions; or may be determined based on the historical or past or previous usage sessions of the same user whose current interactions are analyzed.

In some embodiments, the determination whether or not a particular set of operations were performed within a vishing attack, may take into account one or more other data-items or characteristics; for example, the time-of-day in which those operations were performed. For example, user Adam is accessing his bank account at 2 AM Eastern Time, from his home in Boston; and performs a set of operations that trigger an initial estimation that they were performed within a vishing attack in which an attacker telephoned Adam and dictated to him or instructed him which operations to do. However, the system may have pre-defined time-slots, indicating that in the nightly time-slot of 11 PM until 6 AM, most users in that geographical region are presumed to be asleep, and it is very unlikely that a vishing attacker would call a vishing victim on his phone between 11 PM and 6 AM. Therefore, since the suspected set of operations were performed at 2 AM, this negates the initial estimation, and supports a determination that the operations were performed voluntarily by Adam and not within a vishing attack.

Some embodiments may utilize or may take into account, additionally or alternatively, an analysis of the Typing Rate Pattern or Data-Entry Rate Pattern or Typing Rhythm or Data-Entry Rhythm of the user as a parameter for determining whether it is estimated that the user is operating within a vishing attack. In some embodiments, for example, a user who is performing a voluntarily wire transfer to his friend "Jason Goldsmith", may type "Jason" in one burst of keystrokes, then may exhibit a short delay, and then may type "Goldsmith" in one burst of keystrokes or alternatively in two bursts ("Gold", then a short delay, then "smith"); as these are names that he is familiar with, and he exhibits a fluent Rhythm of typing (or data-entry) with less pauses between chunks of letters and/or with shorter pauses between chunks of letters. In contrast, a vishing victim who is not familiar with this name, and is instructed over the phone to type it, may type it slowly and may break it into a greater number of "chunks" of letters; for example, "Ja" and then "son" for Jason; and "Go" then "ld" then "smi" then "th" for Goldsmith, with more pauses and/or with longer pauses between chunks of letters. Accordingly, longer pauses, and a greater number of pauses, can be detected for data-entry in a field that is dictated or instructed to the typing user, rather than being typed voluntarily on his own accord. The typing rate pattern, or the fluency of data-entry or typing, or the number of letter chunks or letter chains, or the size (in letters) of such chunks, or the number and/or lengths of pauses between such chunks, may be analyzed and may be compared to previous usage-sessions of that same user and/or to pre-defined threshold value(s), in order to determine whether they indicate a vishing attack.

Similarly, the present invention may characterize and utilize the fluency or non-fluency of the user as he navigates and/or operates the on-screen components and GUI elements. For example, a victim of a vishing attack may exhibit slower and less-fluent navigation or operation of GUI elements, for example, slow movement of the on-screen pointer between on-screen GUI elements, as he listens to instructions from the vishing attacker, asks questions, and performs operations that may be at least partially unfamiliar to him. In contrast, a user who acts per his own will, without being instructed, may exhibit a more fluent navigation pattern and utilization of GUI elements, with less pauses, less delays, shorter delays, less mistakes (that are then correct by going back in the navigation), or other characteristics of fluent voluntary utilization of the interface. The system may allocate values to these parameters, and may compare them to previous usage sessions of the same user, and/or to pre-defined threshold values or ranges, in order to determine whether they indicate a vishing attack.

Some embodiments may detect that multiple login sessions occur concurrently, and may utilize this detection as an indicator for a vishing attack. For example, a vishing victim may be instructed by the attacker to login to his account from two devices, or from a first device and then (if the operations fails) from a second device; and the system may thus detect that a single wire transfer was initiated by a (victim) user that logged-in two times from two different devices within a pre-defined period (e.g., 10 minutes, or N minutes), an may utilize this detection of multiple login sessions, or multiple concurrent or partially-overlapping or simultaneous login sessions, as indicator for a vishing attack.

In some embodiments, the system and method of the present invention may autonomously detect that while user Adam is accessing the website of MyBank.com through his smartphone, he is also concurrently talking on the same smartphone. For example, user Adam utilizes his smartphone, launches a web browser, accesses the website MyBank.com, and logs-in to his MyBank account through the web browser on his smartphone. The HTML/JavaScript/CSS code or a web-page on MyBank.com, includes a particular code-portion that causes automatic, silent, video playback of a minuscule video clip (e.g., 1×1 pixel) or a zero-sized video clip (e.g., having dimensions of 0×0 pixels) which has a certain length (e.g., shorter than 5 seconds). If that web-page is served to a smartphone that also has an ongoing telephone call, then the web-browser will not play the video; and the web-page code can detect that no playback has occurred, and determine that a telephone call is ongoing, and transfer this information to the remote server of the bank (or of the trusted third party). In contrast, if the smartphone is not currently within an ongoing telephone call, then the web browser will play the silent and small-size or hidden or zero-size video clip, and the playback event would be detected and reported, to indicate to the remote server that the smartphone is not utilized for an ongoing phone call in addition to web browsing.

For demonstrative purposes, portions of the discussion above and/or herein may relate to a user-invisible or user-transparent or non-observable automatic video playback, which is triggered or invoked and then tested to check if it was indeed performed or not by the end-user device (e.g., smartphone), in order to detect whether the smartphone is currently being utilized also for a cellular call or a telephone call; however, other embodiments of the present invention may similarly utilize a user-invisible or user-transparent or non-observable or non-user-detectable automatic audio playback, and particularly, automatic playback of a silent or an all-silence audio clip or audio segment or audio portion or audio file, which is triggered or invoked and then tested to check if it was indeed performed or not by the end-user device (e.g., smartphone), in order to detect whether the smartphone is currently being utilized also for a cellular call or a telephone call; since a smartphone (or at least some smartphones) that are currently utilized in an active phone call, do not perform automatic playback of an auto-playing audio clip and/or an auto-playing video clip, as to not disturb the user who is on a phone call. For example, the HTML/JavaScript/CSS code or a web-page on MyBank.com, includes a particular code-portion that causes automatic, silent, audio playback of a minuscule audio clip (e.g., optionally utilizing an on-screen component of 1×1 pixel, or a zero-sized on-screen component having dimensions of 0×0 pixels, or alternatively using other methods or plug-ins or add-ons or extensions which may cause or trigger or invoke auto-play of an audio clip on a smartphone) which has a certain length (e.g., shorter than 5 seconds). If that web-page (or other code or similar object) is served to a smartphone that also has an ongoing telephone call, then the web-browser will not auto-play the audio; and the web-page code can detect that no playback of the audio has automatically occurred, and determine that a telephone call is ongoing on that particular smartphone, and transfer this information to the remote server of the bank (or of the trusted third party) and/or to another security or fraud-prevention unit on the smartphone itself. In contrast, if the smartphone is not currently within an ongoing telephone call, then the web browser will auto-play the silent and small-size or hidden audio clip (and/or video clip, if served together with the audio clip; such as, as a double-testing mechanism), and the playback event would be detected and reported, to indicate to the remote server (and/or to other units or modules within the smartphone itself) that the smartphone is not utilized for an ongoing phone call in addition to web browsing.

In a demonstrative implementation, the following code-portion may be utilized as the video auto-play playback code:

```
_createVideoElement(src, maxDuration) {
   this.video = document.createElement('video');
   this.video.style.height = 0;
   this.video.style.width = 0;
   this.video.style.visibility = 'hidden';
   this.video.src = src;
   this.video.zIndex = -1;
   this.video.display = 'none';
   this.video.loop = true;
   this.video.muted = true;
   /*
   ### 'playsinline' property must be set by setAttribute ###
   ### Otherwise Safari browser will play a full screen video ###
   */
   this.video.setAttribute('playsinline', 'true');
```

In a demonstrative implementation, the following code-portion may be used to check the video length and to handle it accordingly; and optionally, a similar code may be utilized with regard to an audio clip:

```
//Is the video duration longer than 5 seconds ?
if(this.video.duration > maxDuration) {
   this. video = null;
}
else { //subscribe to video events
   this._utils.addEventListener(this.video, 'pause', this._handleVideoEvent.bind(this, false));
   this._utils.addEventListener(this.video, 'play', this._handleVideoEvent.bind(this, true));
   this._msgBus.subscribe(exports.MessageBusEventType.TouchEvent,
this._onTouchEvent.bind(this));
   }
}
```

In a demonstrative implementation, the following code-portion may be used to handle the video event:

```
_handleVideoEvent (isPlaying) { }
/*
video is started on touch event ; this is because safari browser ###
will not autoplay 0 pixel size videos automatically ###
starting the video requires user interaction ###
*/
_onTouchEvent(event) {
   if (this._video !== null && event.action ===
         exports.EnumDefs.Events.touchEventType.touchstart) {
      this._msgBus.unsubscribe(exports.MessageBusEventType.TouchEvent,
      this._onTouchCallback);
      document.body.appendChild(this._video);
      this._video.play( );
      var duration = this._configMgr.get('videoPlaybackDurationSec') || 5;
      setTimeout(this.stopFeature.bind(this), duration * 1000);
   }
}
```

In a demonstrative implementation, the following code-portion or script may be used to generate and utilize a silent Push notification, which may indicate to the system (e.g., optionally via a remote URL) whether or not the recipient smartphone is also currently engaging with an ongoing telephone call:

```
/*
This service is initialized as a Firebase push notification service. ###
OnMessageReceived will be called with each incoming push notification. ###
Each message contains a response URL that will receive the query response. ###
Messages are passed to the relevant handler, such as, PhoneStateHandler ###
where they are handled and a response is created. ###
*/
public class PushService extends FirebaseMessagingService {
  @Override
  public void onMessageReceived(RemoteMessage request) {
    super.onMessageReceived(request);
    Map<String, String> data = request.getData( );
    if (data.containsKey("responseUrl")) {
      HttpClient responseClient = new HttpClient(data.get("responseUrl"));
      PushCommunicator communicator = new PushCommunicator(responseClient,
          new PushHandler[ ] {
          new PhoneStateHandler(getApplication( ))
      });
      communicator.handleMessageFromServer(request);
    }
  }
}
```

In a demonstrative implementation, the following code-portion may be used to ensure that the Push notification is "silent" or is "empty" and not seen by the user:

```
/*
Because users should not be aware of the silent notifications, ###
the following message format which does not display a notification may be is used ###
*/
// ANDROID (Firebase)
message = {
  token: token,
  data: {
    msgType: msgType,
    responseUrl: responseUrl
  }
}
// IOS (APN)
message = {
  aps: {
    'content-available': '1'
  },
  payload: {
    msgType: msgType,
    responseUrl: responseUrl
  }
}
```

In a demonstrative implementation, the following code-portion (together with other code-portions described herein) may be used to detect characteristics of the output device (e.g., speakerphone of the smartphone; earphone jack of the smartphone; Bluetooth headset; regular speaker of the smartphone), the phone call state, the phone number, and whether or not it is already stored in the contact list on the smartphone:

```
public class PhoneStateHandler implements PushHandler {
  public enum AudioOut { EARPIECE, SPEAKER, BLUETOOTH, HEADSET }
  private TelephonyManager telephony;
  private AudioManager audioManager;
  private Utils utils;
  private ContentResolver resolver;
```

In a demonstrative implementation, the following code-portion may be used to detect the Phone State:

```
  public PhoneStateHandler(@NonNull Application application, @NonNull Utils utils) {
    this.telephony =
(TelephonyManager)application.getSystemService(Context.TELEPHONY_SERVICE);
    this.audioManager =
(AudioManager)application.getSystemService(Context.AUDIO_SERVICE);
    this.resolver = application.getContentResolver( );
    this.utils = utils;
  }
  @Override
  public void handleMassage(final PushCommunicator pushCommunicator, final PushResponse
response) {
    telephony.listen(new PhoneStateListener( ) {
      public void onCallStateChanged(int state, String phoneNumber) {
        try {
          int output = state != TelephonyManager.CALL_STATE_IDLE ?
              getOutput( ).ordinal( ) : -1;
          if(!phoneNumber.isEmpty( )) {
            response.setData("isInContactList", isInContactList(phoneNumber));
          }
          response.setData("state", state);
          response.setData("output", output);
          response.setData("number", phoneNumber);
        }
        catch (Throwable e) {
          response.setError(e.toString( ));
        }
        finally {
          pushCommunicator.sendResponse(response);
        }
      }
    }, PhoneStateListener.LISTEN_CALL_STATE);
  }
```

In a demonstrative implementation, the following code-portion may be used to detect whether the ongoing phone call is with a phone number that is already stored in the contact list of that particular smartphone:

```
public boolean isInContactList(String phoneNumber) {
  boolean isInContactList = false;
  Uri uri =
      Uri.withAppendedPath(ContactsContract.PhoneLookup.CONTENT_FILTER_URI,
    Uri.encode(phoneNumber));
  Cursor cursor = resolver.query(uri, new
      String[ ]{ContactsContract.PhoneLookup.DISPLAY_NAME}, null, null, null);
  if (cursor != null && cursor.moveToFirst( )) {
    isInContactList = true;
  }
  if(cursor != null) {
    cursor.close( );
  }
  return isInContactList;
}
```

In a demonstrative implementation, the following code-portion may be used to detect the type of Audio Out component being used:

```
public AudioOut getOutput( ) {
  AudioOut output = AudioOut.EARPIECE;
  if(audioManager.isSpeakerphoneOn( )) {
    output = AudioOut.SPEAKER;
  }
  else if(audioManager.isBluetoothScoOn( )) {
    output = AudioOut.BLUETOOTH;
  }
  else if(isWiredHeadsetOn( )) {
    output = AudioOut.HEADSET;
  }
  return output;
}
```

In a demonstrative implementation, the following code-portion may be used to detect whether a Wired Headset is being used for the ongoing phone call:

```
public boolean isWiredHeadsetOn( ) {
  boolean isWiredHeadsetOn = false;
  if (utils.isVersionGreaterOrEqualTo(android.os.Build.VERSION_CODES.M)) {
    AudioDeviceInfo[ ] devices =
```

```
        audioManager.getDevices(AudioManager.GET_DEVICES_OUTPUTS);
      for(AudioDeviceInfo device : devices) {
        int type = device.getType( );
        if( type == AudioDeviceInfo.TYPE_AUX_LINE ||
          type == AudioDeviceInfo.TYPE_WIRED_HEADPHONES ||
          type == AudioDeviceInfo.TYPE_WIRED_HEADSET) {
          isWiredHeadsetOn = true;
          break;
        }
      }
    }
    else {
      isWiredHeadsetOn = audioManager.isWiredHeadsetOn( );
    }
    return is WiredHeadsetOn;
  }
}
```

The above code-portions demonstrate the ability of the present invention, to serve and/or to execute code on a smartphone or on an electronic device, via a web browser and/or via a native application or a mobile app, that provides to the system important information with regard to, for example: (A) whether or not the smartphone is currently being utilized for a telephone call; (B) which audio output component is utilized; (C) whether or not the ongoing phone call is with a phone number that is already stored in the contact list of the smartphone; and/or other suitable parameters, which may be utilized, individually or in combination, to determine that the user is a victim of a vishing attack, or to support (or to negate) such determination. For example, detecting that A is positive (the user is also engaging in a phone call) supports or strengthens a vishing determination; whereas, detecting that A is negative negates or weakens a vishing determination. For example, parameter B indicating that a speakerphone is used, may support or may strengthen a vishing determination. For example, parameter C being positive, may weaken a vishing determination since it is more likely that a vishing attacker is not utilizing a phone number that is pre-stored in the victim's contact list (which is unknown to the victim's attacker, and typically includes his friends, his family, and his co-workers). The system of the present invention may utilize a lookup table, or a weighted function or formula, or a scoring mechanism, to allocate weights or scores to each parameter of detected condition, and to calculate an aggregate or cumulative or weighted score with regard to the probability of vishing attack based on these weighted parameters or score-components.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

The present invention may enable machines and/or computerized systems to have new capabilities and/or new functions that were not available to such machines or systems so far; including, for example: a new capability to correctly differentiate among multiple human users; a new capability for machines or computerized systems to differentiate between (I) a legitimate or "naïve" user, and (II) a fraudster or a human user having criminal intent or an illegitimate user; a new capability for machines or computerized systems allowing the machine or the computerized system to defend itself or to protect itself against cyber-attacks and/or illegitimate operations, and/or against impostors or identity-thieves or dishonest users; a new capability for machines or computerized systems to correctly identify and/or detect that a current user of an online resource or an online destination, is not the same human user that had accessed the same resource previously, even if the two access sessions were performed via the same device and/or via the same browser or application and/or from the same IP address and/or when the user/s are already logged-in and/or are already authenticated; a new capability for machines or computerized systems to defend or protect themselves against fraudulent transactions or criminal behavior or against hackers, crackers, human hackers, automated hacking tools, "bot" or other automated scripts; a new capability for machines or computerized systems to initiate and to perform fraud-mitigation operations based on analysis of user interactions; improved security and/or integrity and/or reliability of machines and computerized systems; and/or other new capabilities that conventional machines and conventional computerized systems do not have and that the present invention provides.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

In some embodiments, a method comprises: (a) monitoring user interactions of a user that utilizes an electronic device to interact with a computerized service; (b) analyzing said user interactions, and determining that a set of operations were performed by said user as part of a vishing attack in which an attacker dictated to said user which operations to perform in said computerized service.

In some embodiments, the analyzing of step (b) comprises: determining that said set of operations were performed as part of a vishing attack, based on a detected match between: (I) said set of operations, and (II) a pre-defined playbook of operations that are dictated by attackers in vishing attacks.

In some embodiments, the analyzing of step (b) comprises: (i) comparing between (I) said set of operations performed by the user, and (II) a pre-defined vishing attack playbook that is utilized by vishing attackers; (ii) determining that said set of operations is sufficiently similar, beyond a pre-defined threshold value of similarity, to said pre-defined vishing attack playbook; (iii) based on the determining of step (ii), determining that said set of operations were performed by said user as part of a vishing attack.

In some embodiments, the method comprises: (i) storing in a vishing attack playbook database, two or more playbooks of vishing attacks; (ii) comparing between (I) said set of operations performed by the user, and (II) each one of said two or more playbooks of vishing attacks; (iii) determining that said set of operations is sufficiently similar, beyond a pre-defined threshold value of similarity, to a particular playbook; (iv) based on the determining of step (iii), determining that said set of operations were performed by said user as part of a vishing attack.

In some embodiments, the monitoring of step (a) comprises: monitoring user interactions of a customer of a financial service provider, wherein said user utilizes said electronic device to interact with a website or an application of said financial service provider; wherein step (b) comprises: (A) scanning historic transactions that were submitted online to said financial service provider; (B) detecting a match between (I) a set of online operations that were performed as part of a particular historic transaction, and (II) a pre-defined playbook of vishing attack; (C) based on the match detected in step (B), determining that said historic transaction was more-probably performed by a victim of a vishing attack that received dictated telephonic instructions.

In some embodiments, the monitoring of step (a) comprises: determining a particular typing rhythm that characterizes said set of operations performed by said user; wherein step (b) comprises: comparing between (I) the particular typing rhythm that characterizes said set of operations performed by said user, and (II) one or more typing rhythms that characterize data entry by vishing attack victims that perform dictated instructions; and based on said comparing, determining that said set of operations were performed by said user as part of a vishing attack.

In some embodiments, the method comprises: storing in a database two or more representations of typing rhythms that characterize data entry by victims of vishing attacks; wherein the monitoring of step (a) comprises: determining a particular typing rhythm that characterizes said set of operations performed by said user; wherein step (b) comprises: detecting a match between (I) the particular typing rhythm that characterizes said set of operations performed by said user, and (II) at least one typing rhythm that characterizes victims of vishing attacks as stored in said database.

In some embodiments, step (b) comprises: (A) detecting that said user interactions, during a process of entering a financial transaction, include a doodling activity; (B) based on the detecting of step (A), determining that said financial transaction was entered by a victim of a vishing attack.

In some embodiments, step (b) comprises: (A) detecting that said user interactions, during a process of entering a financial transaction, include a doodling activity that is longer than a pre-defined threshold value of N seconds, wherein N is a positive number; (B) based on the detecting of step (A), determining that said financial transaction was entered by a victim of a vishing attack.

In some embodiments, step (b) comprises: (A) detecting that said user interactions, during a process of entering a financial transaction, include a doodling activity; and further detecting that previous usage sessions by said user did not include doodling activity; (B) based on step (A), determining that said financial transaction was entered by a victim of a vishing attack.

In some embodiments, step (b) comprises: (A) detecting that said user interactions, during a process of entering a financial transaction, include a doodling activity that is longer than a pre-defined threshold value of N seconds, wherein N is a positive number; and further determining that previous usage sessions of said user included doodling activity that is shorter than a pre-defined value of M seconds, wherein M is a positive number and wherein M is smaller than N; and (B) based on step (A), determining that said financial transaction was entered by a victim of a vishing attack.

In some embodiments, said electronic device is a smartphone; wherein step (b) comprises: (A) sensing device orientation data of said smartphone, via at least one of: an accelerometer of said smartphone, a gyroscope of said smartphone, a compass unit of said smartphone, a device-orientation sensor of said smartphone; (B) detecting an alternating usage pattern of said smartphone, in which the smartphone is alternating between: (B1) being utilized for hearing telephonic audio while not being engaged via its touch-screen, and (B2) being engaged via its touch-screen;

(C) based on the alternating usage pattern detected in step (B), determining that said smartphone was utilized to access said computerized service within a vishing attack against said user.

In some embodiments, step (b) comprises: (A) detecting that said user interactions, during a process of entering a financial transaction, exhibit a behavioral pattern that matches a pre-defined behavioral pattern that characterizes users that both (A1) operate an electronic device to access the computerized service and also (A2) concurrently hold a phone to their ear; (B) based on step (A), determining that said financial transaction was entered by a victim of a vishing attack.

In some embodiments, step (b) comprises: (A) detecting that said user interactions, during a process of entering a financial transaction, exhibit a data entry rhythm that matches a pre-defined data entry rhythm that characterizes users that both (A1) operate an electronic device to access the computerized service and also (A2) concurrently hold a phone to their ear; (B) based on step (A), determining that said financial transaction was entered by a victim of a vishing attack.

In some embodiments, step (b) comprises: (A) detecting that said user interactions, during a process of entering a financial transaction, exhibit a typographical errors introduction rhythm that matches a pre-defined typographical errors introduction rhythm that characterizes users that both (A1) operate an electronic device to access the computerized service and also (A2) concurrently hold a phone to their ear; (B) based on step (A), determining that said financial transaction was entered by a victim of a vishing attack.

In some embodiments, step (b) comprises: (A) detecting that said user interactions, during a process of entering a financial transaction, exhibit a behavioral pattern that indicates that said user is utilizing only one hand to enter data and to engage with GUI elements of said computerized service; (B) based on an analysis that takes into account at least the detecting result of step (A), determining that said financial transaction was entered by a victim of a vishing attack.

In some embodiments, said electronic device is a non-smartphone device; wherein step (b) comprises: (A) sensing device orientation data and device spatial data of said electronic device, via at least one of: an accelerometer of said electronic device, a gyroscope of said electronic device, a compass unit of said electronic device, a device-orientation sensor of said electronic device; (B) detecting that said user interactions, during a process of entering a financial transaction, exhibit a pattern of device orientation data and of device spatial data that is sufficiently similar to a pre-defined pattern that characterizes computing devices that are operated by victims of vishing attacks while also holding a phone to their ear; (C) based on step (B), determining that said financial transaction was entered by a victim of a vishing attack.

In some embodiments, said electronic device is a non-smartphone device; wherein step (b) comprises: (A) detecting an alternating usage pattern of said electronic device by said user, which alternates between: (A1) a period of no data entry through the electronic device, and (A2) a period of data entry through the electronic device; (B) determining that said alternating usage pattern matches a pre-defined usage pattern of electronic devices that are utilized in a vishing attack; (C) based on step (B), determining that said financial transaction was entered by a victim of a vishing attack.

Some embodiments comprise a non-transitory storage article or storage medium having stored thereon instruction that, when executed by a machine, cause the machine to perform a method as described above or herein.

In some embodiments, a system comprises a vishing attack detector, configured (a) to monitor user interactions of a user that utilizes an electronic device to interact with a computerized service, and (b) to analyze said user interactions, and to determine that a set of operations were performed by said user as part of a vishing attack in which an attacker dictated to said user which operations to perform in said computerized service.

The present invention comprises devices, systems, and methods of detecting a vishing attack, in which an attacker provides to a victim step-by-step over-the-phone instructions that command the victim to log-in to his bank account and to perform a dictated banking transaction. For example, the system monitors transactions, online operations, user interactions, gestures performed via input units, and user engagement with User Interface elements. The system detects that the operations performed by the victim, follow a pre-defined playbook of a vishing attack. The system detects that the victim operates under duress or under dictated instructions, as exhibited in irregular doodling activity, data entry rhythm, typographical error introduction rhythm, unique posture of the user, alternating pattern of listening to phone instructions and performing online operations via a computer, and device orientation changes or spatial changes that characterize a device being used to perform an online transaction while also talking on the phone.

In some embodiments, a method or a process comprises: (a) monitoring information that includes at least one of: (i) user interactions of a user that utilizes an electronic device to interact with a computerized service, (ii) operational characteristics of said electronic device; (b) analyzing said information, and determining that a set of operations were performed by said user as part of a vishing attack in which an attacker dictated to said user which operations to perform in said computerized service.

In some embodiments, the method or the process comprises: monitoring an average typing speed of said user; and based on monitored average typing speed of said user, determining that said set of operations were performed as part of a vishing attack.

In some embodiments, the method or the process comprises: monitoring an average mouse-click speed of said user; and based on monitored average mouse-clock speed of said user, determining that said set of operations were performed as part of a vishing attack.

In some embodiments, the method or the process comprises: monitoring a usage-session time-length of multiple usage-sessions of said user; and based on monitored usage-session time-length, determining that said set of operations were performed as part of a vishing attack.

In some embodiments, the method or the process comprises: monitoring periods of inactivity of said user during usage sessions; and based on monitored inactivity periods, determining that said set of operations were performed as part of a vishing attack.

In some embodiments, the method or the process comprises: monitoring frequency of on-screen-pointer turns of said user; and based on monitored frequency of on-screen-pointer turns, determining that said set of operations were performed as part of a vishing attack.

In some embodiments, the method or the process comprises: monitoring an average on-screen distance traveled between clicks of said user; and based on monitored on-screen distance traveled between clicks, determining that said set of operations were performed as part of a vishing attack.

In some embodiments, the method or the process comprises: monitoring an average speed of movement of on-screen-pointer; and based on monitored average speed of movement of on-screen-pointer, determining that said set of operations were performed as part of a vishing attack.

In some embodiments, the method or the process comprises: monitoring a ratio of displacement to distance of on-screen-pointer; and based on monitored ratio of displacement to distance, determining that said set of operations were performed as part of a vishing attack.

In some embodiments, the method or the process comprises: monitoring accelerometer data of said electronic device, and determining that said electronic device is alternated by said user, between (i) a first position in which the electronic device is positioned generally-vertically at the user's ear and is used for talking, and (ii) a second position in which the electronic device is positioned generally-horizontally and is used for operating its touch-screen; based on alternation back-and-forth between the first position and the second position, determining that said set of operations were performed as part of a vishing attack.

In some embodiments, the method or the process comprises: monitoring gyroscope data of said electronic device, and determining that said electronic device is alternated by said user, between (i) a first position in which the electronic device is positioned generally-vertically at the user's ear and is used for talking, and (ii) a second position in which the electronic device is positioned generally-horizontally and is used for operating its touch-screen; based on alternation back-and-forth between the first position and the second position, determining that said set of operations were performed as part of a vishing attack.

In some embodiments, the method or the process comprises: monitoring device-orientation data of said electronic device, and determining that said electronic device is alternated by said user, between (i) a first position in which the electronic device is positioned generally-vertically at the user's ear and is used for talking, and (ii) a second position in which the electronic device is positioned generally-horizontally and is used for operating its touch-screen; based on alternation back-and-forth between the first position and the second position, determining that said set of operations were performed as part of a vishing attack.

In some embodiments, the method or the process comprises: instructing said electronic device to automatically play a particular video clip; checking whether said video clip was actually played by said electronic device; and based on the checking result, determining that said set of operations were performed as part of a vishing attack.

In some embodiments, the method or the process comprises: instructing said electronic device to automatically play a particular video clip that is non-observable to a user of said electronic device; checking whether said video clip was actually played by said electronic device; and based on the checking result, determining that said set of operations were performed as part of a vishing attack.

In some embodiments, the method or the process comprises: detecting a set of operations that were performed by said user via said electronic device, which triggers an initial estimation that said set of operations were performed within a vishing attack; determining that said set of operations were performed during a nightly time-slot in which most users in a particular geographic region are asleep; and detecting that said initial estimation of a vishing attack is incorrect.

In some embodiments, the method or the process comprises: (A) defining a parameter that indicates fluency of navigation of the user through multiple pages and multiple GUI elements of an online interface; (B) tracking fluency of navigation of said user across multiple usage sessions, and updating said parameter; (C) based on said parameter indicating fluency of navigation, determining that said set of operations were performed as part of a vishing attack.

In some embodiments, the method or the process comprises: (A) defining a parameter that indicates characteristics of letter-chunks that the user enters consecutively; (B) tracking data-entry by the user across multiple usage-sessions, and updating said parameter; (C) based on said parameter indicating characteristics of letter-chunks, determining that said set of operations were performed as part of a vishing attack.

In some embodiments, determining that said set of operations were performed as part of a vishing attack, is based at least in part on detecting that a single online account of said user was accessed via multiple different login sessions within a pre-defined time period.

In some embodiments, the method or the process comprises: monitoring characteristics of typing rhythm exhibited by said user; and based on monitored characteristics of typing rhythm, determining that said set of operations were performed as part of a vishing attack.

In some embodiments, the method or the process comprises: (A) monitoring characteristics of typing rhythm exhibited by said user; (B) determining that typing rhythm in a particular usage-session of said user, is sufficiently different from previous typing rethemes exhibited in multiple previous usage-sessions of said user; and determining that said particular usage-session was part of a vishing attack.

In some embodiments, the method or the process comprises: instructing said electronic device to automatically play a particular audio clip; checking whether said audio clip was actually played by said electronic device; and based on the checking result, determining that said set of operations were performed as part of a vishing attack.

In some embodiments, the method or the process comprises: instructing said electronic device to automatically play a silent audio clip; checking whether said silent audio clip was actually played by said electronic device; and based on the checking result, determining that said set of operations were performed as part of a vishing attack.

In some embodiments, the method or the process comprises: monitoring an average time-gap between on-screen taps that said user performs directly via a touch-screen; and based on monitored average time-gap between on-screen taps that said user performs directly via said touch-screen, determining that said set of operations were performed as part of a vishing attack.

In some embodiments, the method or the process comprises: monitoring a maximum value of typing speed of said user; and based on monitored maximum value of typing speed of said user, determining that said set of operations were performed as part of a vishing attack.

In some embodiments, the method or the process comprises: monitoring a minimum value of typing speed of said user; and based on monitored minimum value of typing speed of said user, determining that said set of operations were performed as part of a vishing attack.

In some embodiments, the method or the process comprises: monitoring a maximum value of mouse-click speed of said user; and based on monitored maximum value of mouse-click speed of said user, determining that said set of operations were performed as part of a vishing attack.

In some embodiments, the method or the process comprises: monitoring a minimum value of mouse-click speed of said user; and based on monitored minimum value of mouse-click speed of said user, determining that said set of operations were performed as part of a vishing attack.

In some embodiments, the method or the process comprises: (A) detecting that user interactions, during a process of entering data of a financial transaction, include an average idle-time that is longer than a pre-defined threshold value of N seconds, wherein N is a positive number; (B) based on the detecting of step (A), determining that said financial transaction was entered by a victim of a vishing attack.

In some embodiments, the method or the process comprises: (A) detecting that user interactions, during a process of entering data of a financial transaction, include a number of idle-time events that is greater by at least N percent than a pre-defined threshold value, wherein N is a positive number; (B) based on the detecting of step (A), determining that said financial transaction was entered by a victim of a vishing attack.

In some embodiments, the method or the process comprises: (A) detecting that said user interactions, during a process of entering data of a financial transaction, exhibit a pattern of correction of typographical errors that is different from said pattern exhibited in previous usage-sessions of said user; (B) based on step (A), determining that said financial transaction was entered by a victim of a vishing attack.

In some embodiments, the method or the process comprises: (A) detecting that said user interactions, during a process of performing a financial transaction, exhibit a current number of user-hesitation indicators that is greater than a previous number of user-hesitation indicators that were exhibited in one or more previous usage-sessions of said user; (B) based on step (A), determining that said financial transaction was entered by a victim of a vishing attack.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
    (a) monitoring user interactions of a user that utilizes an electronic device to interact with a particular user-account of a computerized service;
    (b) detecting that said particular user-account is being accessed concurrently via two or more different log-in sessions from two or more different devices;
    (c) based on analysis of user interactions and further based on the detecting of step (b), determining that a set of operations were performed by said user in said particular user-account under orders from an attacker who dictated to said user which operations to perform in said particular user-account of said computerized service;
    (d) wherein the method comprises at least one of:
        (d1) defining a Navigation Fluency Parameter, that indicates fluency of navigation of the user through multiple pages and multiple Graphic User Interface (GUI) elements of an online interface; tracking fluency of navigation of said user across multiple usage sessions, and updating said Navigation Fluency parameter; and based on said Navigation Fluency parameter, determining that said set of operations were performed as part of a vishing attack;
        (d2) defining a Letter-Chunks Characteristic Parameter, that indicates one or more characteristics of letter-chunks that the user enters consecutively; tracking data-entry by the user across multiple usage-sessions, and updating said Letter-Chunks Characteristic Parameter; and based on said Letter-Chunks Characteristic Parameter, determining that said set of operations were performed as part of a vishing attack.

2. The method of claim 1,
wherein monitoring user interactions comprises monitoring an average typing speed of said user; and based on monitored average typing speed of said user, determining that said set of operations were performed as part of a vishing attack.

3. The method of claim 1,
wherein monitoring user interactions comprises monitoring an average mouse-click speed of said user; and based on monitored average mouse-clock speed of said user, determining that said set of operations were performed as part of a vishing attack.

4. The method of claim 1,
wherein monitoring user interactions comprises monitoring a usage-session time-length of multiple usage-sessions of said user; and based on monitored usage-session time-length, determining that said set of operations were performed as part of a vishing attack.

5. The method of claim 1,
wherein monitoring user interactions comprises monitoring periods of inactivity of said user during usage sessions; and based on monitored inactivity periods, determining that said set of operations were performed as part of a vishing attack.

6. The method of claim 1,
wherein monitoring user interactions comprises monitoring frequency of on-screen-pointer turns of said user; and based on monitored frequency of on-screen-pointer turns, determining that said set of operations were performed as part of a vishing attack.

7. The method of claim 1,
wherein monitoring user interactions comprises monitoring an average on-screen distance traveled between clicks of said user; and based on monitored on-screen distance traveled between clicks, determining that said set of operations were performed as part of a vishing attack.

8. The method of claim 1,
wherein monitoring user interactions comprises monitoring an average speed of movement of on-screen-pointer; and based on monitored average speed of movement of on-screen-pointer, determining that said set of operations were performed as part of a vishing attack.

9. The method of claim 1,
wherein monitoring user interactions comprises monitoring a ratio of displacement to distance of on-screen-pointer; and based on monitored ratio of displacement to distance, determining that said set of operations were performed as part of a vishing attack.

10. The method of claim 1, comprising:
determining whether an initial estimation of a vishing attack is correct or incorrect, by taking into account a time-of-day in which said set of operations were performed.

11. The method of claim 1,
wherein monitoring user interactions comprises:
monitoring characteristics of typing rhythm exhibited by said user; and based on monitored characteristics of typing rhythm, determining that said set of operations were performed as part of a vishing attack.

12. The method of claim 1,
wherein monitoring user interactions comprises:
(A) monitoring characteristics of typing rhythm exhibited by said user;
(B) determining that typing rhythm in a particular usage-session of said user, is sufficiently different from previous typing rethemes exhibited in multiple previous usage-sessions of said user; and determining that said particular usage-session was part of a vishing attack.

13. The method of claim 1,
wherein monitoring user interactions comprises:
monitoring an average time-gap between on-screen taps that said user performs directly via a touch-screen; and based on monitored average time-gap between on-screen taps that said user performs directly via said touch-screen, determining that said set of operations were performed as part of a vishing attack.

14. The method of claim 1,
wherein monitoring user interactions comprises:
monitoring a maximum value of typing speed of said user; and based on monitored maximum value of typing speed of said user, determining that said set of operations were performed as part of a vishing attack.

15. The method of claim 1,
wherein monitoring user interactions comprises:
monitoring a minimum value of typing speed of said user; and based on monitored minimum value of typing speed of said user, determining that said set of operations were performed as part of a vishing attack.

16. The method of claim 1,
wherein monitoring user interactions comprises:
monitoring a maximum value of mouse-click speed of said user; and based on monitored maximum value of mouse-click speed of said user, determining that said set of operations were performed as part of a vishing attack.

17. The method of claim 1,
wherein monitoring user interactions comprises:
monitoring a minimum value of mouse-click speed of said user; and based on monitored minimum value of mouse-click speed of said user, determining that said set of operations were performed as part of a vishing attack.

18. A non-transitory storage medium having stored thereon instructions that, when executed by one or more processors, cause the one or more processors to perform a method comprising:

(a) monitoring user interactions of a user that utilizes an electronic device to interact with a particular user-account of a computerized service;
(b) detecting that said particular user-account is being accessed concurrently via two or more different log-in sessions from two or more different devices;
(c) based on analysis of user interactions and further based on the detecting of step (b), determining that a set of operations were performed by said user in said particular user-account under orders from an attacker who dictated to said user which operations to perform in said particular user-account of said computerized service;
(d) wherein the method comprises at least one of:
 (d1) defining a Navigation Fluency Parameter, that indicates fluency of navigation of the user through multiple pages and multiple Graphic User Interface (GUI) elements of an online interface; tracking fluency of navigation of said user across multiple usage sessions, and updating said Navigation Fluency parameter; and based on said Navigation Fluency parameter, determining that said set of operations were performed as part of a vishing attack;
 (d2) defining a Letter-Chunks Characteristic Parameter, that indicates one or more characteristics of letter-chunks that the user enters consecutively; tracking data-entry by the user across multiple usage-sessions, and updating said Letter-Chunks Characteristic Parameter; and based on said Letter-Chunks Characteristic Parameter, determining that said set of operations were performed as part of a vishing attack.

19. A system comprising:
one or more processors, operably associated with one or more memory units;
wherein the one or more processors are configured:
(a) to monitor user interactions of a user that utilizes an electronic device to interact with a particular user-account of a computerized service;
(b) to detect that said particular user-account is being accessed concurrently via two or more different log-in sessions from two or more different devices;
(c) based on analysis of user interactions and further based on a detection reached in (b) above, to determine that a set of operations were performed by said user in said particular user-account under orders from an attacker who dictated to said user which operations to perform in said particular user-account of said computerized service;
(d) to perform at least one of:
 (d1) to define a Navigation Fluency Parameter, that indicates fluency of navigation of the user through multiple pages and multiple Graphic User Interface (GUI) elements of an online interface; to track fluency of navigation of said user across multiple usage sessions, and to update said Navigation Fluency parameter; and based on said Navigation Fluency parameter, to determine that said set of operations were performed as part of a vishing attack;
 (d2) to define a Letter-Chunks Characteristic Parameter, that indicates one or more characteristics of letter-chunks that the user enters consecutively; to track data-entry by the user across multiple usage-sessions, and to update said Letter-Chunks Characteristic Parameter; and based on said Letter-Chunks Characteristic Parameter, to determine that said set of operations were performed as part of a vishing attack.

* * * * *